US011511745B2

(12) United States Patent
Graves et al.

(10) Patent No.: US 11,511,745 B2
(45) Date of Patent: Nov. 29, 2022

(54) METHOD AND SYSTEM FOR ADAPTIVELY CONTROLLING OBJECT SPACING

(71) Applicants: Daniel Mark Graves, Edmonton (CA); Kasra Rezaee, Kitchener (CA)

(72) Inventors: Daniel Mark Graves, Edmonton (CA); Kasra Rezaee, Kitchener (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 724 days.

(21) Appl. No.: 15/965,182

(22) Filed: Apr. 27, 2018

(65) Prior Publication Data

US 2019/0329772 A1 Oct. 31, 2019

(51) Int. Cl.
*B60W 30/16* (2020.01)
*G05B 13/04* (2006.01)
*G05B 13/02* (2006.01)

(52) U.S. Cl.
CPC ......... *B60W 30/16* (2013.01); *B60W 2554/80* (2020.02); *B60W 2754/10* (2020.02); *G05B 13/0285* (2013.01); *G05B 13/048* (2013.01)

(58) Field of Classification Search
None
See application file for complete search history.

(56) References Cited

U.S. PATENT DOCUMENTS

| | | | |
|---|---|---|---|
| 6,317,058 B1 * | 11/2001 | Lemelson | G08G 1/07 340/905 |
| 7,512,475 B2 | 3/2009 | Perisho, Jr. et al. | |
| 8,903,588 B2 | 12/2014 | Schmüdderich et al. | |
| 10,671,076 B1 * | 6/2020 | Kobilarov | B60W 40/00 |
| 2012/0330542 A1 | 12/2012 | Hafner et al. | |
| 2014/0309836 A1 | 10/2014 | Ollis | |
| 2015/0142299 A1 | 5/2015 | Shin et al. | |
| 2015/0266475 A1 * | 9/2015 | Tanzmeister | B60W 30/0956 701/301 |
| 2016/0075335 A1 | 3/2016 | Arndt et al. | |
| 2016/0351054 A1 | 12/2016 | Zhang et al. | |
| 2017/0129466 A1 * | 5/2017 | Okubo | B60T 7/22 |

(Continued)

FOREIGN PATENT DOCUMENTS

| | | |
|---|---|---|
| CN | 103693040 A | 4/2014 |
| CN | 104648395 A | 5/2015 |

(Continued)

OTHER PUBLICATIONS

Kikuchi, Shinya; "Car-Following Model Based on Fuzzy Inference System"; Mar. 1993; Transportation Research Record; No. 1365; http://onlinepubs.trb.org/Onlinepubs/trr/1992/1365/1365.pdf#page=86 (Year: 1993).*

(Continued)

*Primary Examiner* — David P. Merlino

(57) ABSTRACT

A method or system for adaptive vehicle spacing, including determining a current state of a vehicle based on sensor data captured by sensors of the vehicle; for each possible action in a set of possible actions: (i) predicting based on the current vehicle state a future state for the vehicle, and (ii) predicting, based on the current vehicle state a first zone future safety value corresponding to a first safety zone of the vehicle; and selecting, based on the predicted future states and first zone future safety values for each of the possible actions in the set, a vehicle action.

19 Claims, 8 Drawing Sheets

(56) References Cited

U.S. PATENT DOCUMENTS

| | | | |
|---|---|---|---|
| 2017/0210359 A1* | 7/2017 | Brandin | G08G 1/166 |
| 2017/0249844 A1 | 8/2017 | Perkins et al. | |
| 2017/0277194 A1* | 9/2017 | Frazzoli | G05D 1/0212 |
| 2018/0059670 A1* | 3/2018 | Nilsson | B60W 30/09 |
| 2018/0089563 A1* | 3/2018 | Redding | G06N 3/006 |
| 2018/0154891 A1* | 6/2018 | Schneider | B60T 7/22 |
| 2018/0284785 A1* | 10/2018 | Berntorp | G06N 3/08 |
| 2019/0092327 A1* | 3/2019 | Osaki | B60W 30/16 |
| 2019/0101917 A1* | 4/2019 | Yao | B60W 50/0097 |
| 2019/0113918 A1* | 4/2019 | England | G05D 1/0274 |
| 2019/0220737 A1* | 7/2019 | Yao | G06N 3/006 |
| 2019/0308632 A1* | 10/2019 | Chase | B60W 30/18172 |
| 2019/0332922 A1* | 10/2019 | Nachum | G06N 3/006 |
| 2020/0290638 A1* | 9/2020 | Damnjanovic | G08G 1/0112 |

FOREIGN PATENT DOCUMENTS

| | | |
|---|---|---|
| CN | 105416289 A | 3/2016 |
| CN | 107117165 A | 9/2017 |
| WO | 2018030082 A1 | 2/2018 |

OTHER PUBLICATIONS

S. Magdici et al., "Adaptive Cruise Control with Safety Guarantees for Autonomous Vehicles", Proc. World Congress Intl. Fed. Of Autonomatic Control, 2017.

D. Moser et al., "Flexible Spacing Adaptive Cruise Control Using Stochastic Model Predictive Control", IEEE Transactions on Control Systems Technology, vol. 26, No. 1, Jan. 2018.

D. Moser et al., "A Risk Constrained Control Approach for Adaptive Cruise Control", IEEE Conference on Control Technology and Applications (CCTA), Kohala Coast, Hawai'i, USA, Aug. 27-30, 2017.

D. Zhao et al., "A Supervised Actor-Critic Approach for Adaptive Cruise Control", Soft Computing, vol. 17, pp. 2089-2099, 2013.

R. Sutton et al., "Horde: A Scalable Real-time Architecture for Learning Knowledge from Unsupervised Sensorimotor Interaction", Proc. of 10th Intl. Conf. on Autonomous Agents and Multiagent Systems, Taipei, Taiwan, 2011.

D. Silver et al., "Mastering the game of Go with deep neural networks and tree search", Nature, vol. 529, No. 7587, 2016.

M. C. G. d. Silva, "Measurements of comfort in vehicles", Measurement Science and Technology, vol. 13, 2002.

E. F. Camacho et al., "Model Predictive Control", Springer, 2007.

Andreas A. Malikopoulos et al. A Closed-Form Analytical Solution for Optimal Coordination of Connected and Automated Vehicles, arXiv:1908.05159v1, Aug. 13, 2019. total 6 pages.

Andreas A. Malikopoulos et al. Optimal Control for Speed Harmonization of Automated Vehicles, IEEE Transactions on Intelligent Transportation Systems, vol. 20, No. 7, Jul. 2019, pp. 2405-2417.

* cited by examiner

METHOD AND SYSTEM FOR ADAPTIVELY CONTROLLING OBJECT SPACING

TECHNICAL FIELD

The present disclosure relates to systems for controlling spacing between moving objects such as vehicles.

BACKGROUND

Cruise control is standard in many cars today. However, basic cruise control merely controls acceleration and deceleration to achieve a target speed and does not prevent accidents by adjusting speeds based on the surrounding traffic and driving conditions. As a result, adaptive cruise control (ACC) has found much interest in advanced driver assistance systems (ADAS) to improve the safety of cruise control systems. The advantages are improved safety, comfort, and fuel efficiency.

A common solution for ACC is to use model predictive control (MPC). However, classical approaches do not consider the concern of rear-end collisions that may result when slowing down too quickly to adapt speed or avoid a collision. In addition, MPC requires a model of the world. Often the model is too simple and prone to errors especially when making longer term predictions as these errors accumulate quickly. To exacerbate this issue, many classical MPCs are not able to make effective predictions when there is stochasticity introduced in the environment by unknown policies (and change in policies) of the other drivers. This significantly reduces long term prediction performance which is critical for a controller to be able to anticipate the need to slow down earlier in order to avoid rear-end collisions. As a result, there is a clear need to control spacing between front and rear vehicles. In addition, existing solutions to ACC often do not adapt to varying road conditions such as ice, water, and gravel.

A supervised actor-critic approach has also been suggested for ACC that pre-trains the actor with a supervised baseline ACC. This approach, while effective, ignores the vehicle behind and maps state directly to action (policy), making it challenging to ensure the policy guarantees safe operation within the environment.

For the foregoing and other reasons, improvements in systems that control spacing between moving objects are desirable.

SUMMARY

According to a first example aspect of the present disclosure is a method that includes: determining a current state of a vehicle based on sensor data captured by sensors of the vehicle; for each possible action in a set of possible actions: (i) predicting based on the current vehicle state a future state for the vehicle, and (ii) predicting, based on the current vehicle state a first zone future safety value corresponding to a first safety zone of the vehicle; and selecting, based on the predicted future states and first zone future safety values for each of the possible actions in the set, a vehicle action.

In some embodiments of the first example aspect, the method further includes, for each possible action in the set, predicting, a second zone future safety value corresponding to a second safety zone of the vehicle, wherein selecting the vehicle action is also based on the predicted second zone future safety values.

In some embodiments of the first example aspect, the selected vehicle action is also based on a target vehicle state, the method comprising controlling the vehicle to perform the selected vehicle action.

In some embodiments of the first example aspect, the first safety zone is located in front of the vehicle and the predicted first zone future safety value for each of the possible actions indicates a likelihood of a leading vehicle being present in the first safety zone, and the second safety zone is located behind the vehicle and the predicted second zone future safety value for each of the possible actions indicates a likelihood of a trailing vehicle being present in the second safety zone.

In some embodiments of the first example aspect wherein the future state, the future first zone value and the future second zone value for each possible action are predicted using one or more trained neural networks.

In some embodiments of the first example aspect the current vehicle state includes: (i) a speed of the vehicle; (ii) a distance from the vehicle to any leading vehicle detected in front of the vehicle; and (iii) a distance from the vehicle to any trailing vehicle detected in back of the vehicle.

In some embodiments of the first example aspect, the current vehicle state includes a current first zone safety value indicating if a leading vehicle is currently present in the first safety zone and a current second zone safety value indicating if a trailing vehicle is currently present in the second safety zone.

In some embodiments of the first example aspect, the method includes determining the set of possible actions based on the current state of the vehicle.

In some embodiments of the first example aspect, selecting the vehicle action comprises selecting an action for which the predicted future state satisfies a state condition and the predicted future first zone safety value satisfies a first zone safety condition.

In various embodiments of the first example aspect, selecting the vehicle action is performed by a fuzzy inference system, or a model predictive controller, or a control daemon general value function (GVF), or a rule-based controller.

According to a second example aspect, is an adaptive spacing predictive control system that includes a processor system and a memory coupled to the processor system. The memory tangibly stores thereon executable instructions that, when executed by the processor system, cause the processor system to: determine a current state of a vehicle based on sensor data captured by sensors of the vehicle; predict, based on the current vehicle state, a future state for the vehicle for each possible action in a set of possible actions; predict, based on the current vehicle state, a first zone future safety value associated with a first safety zone of the vehicle for each possible action in the set of possible actions; and select, based on the predicted future states and first zone future safety values for each of the possible actions, a vehicle action and then cause the vehicle to implement the action.

In example embodiments of the second example aspect, the processing system also predicts a second safety zone future safety value corresponding to a second safety zone for the vehicle for each possible action in the set of possible actions and selects the vehicle action also based on the predicted second zone future safety values. In some examples, the first safety zone is located in front of the vehicle and the predicted first zone future safety value for each of the possible actions indicates a likelihood of a leading vehicle being present in the first safety zone, and the second safety zone is located behind the vehicle and the predicted second zone future safety value for each of the possible actions indicates a likelihood of a trailing vehicle being present in the second safety zone.

DESCRIPTION OF EXAMPLE EMBODIMENTS

Figure 1:
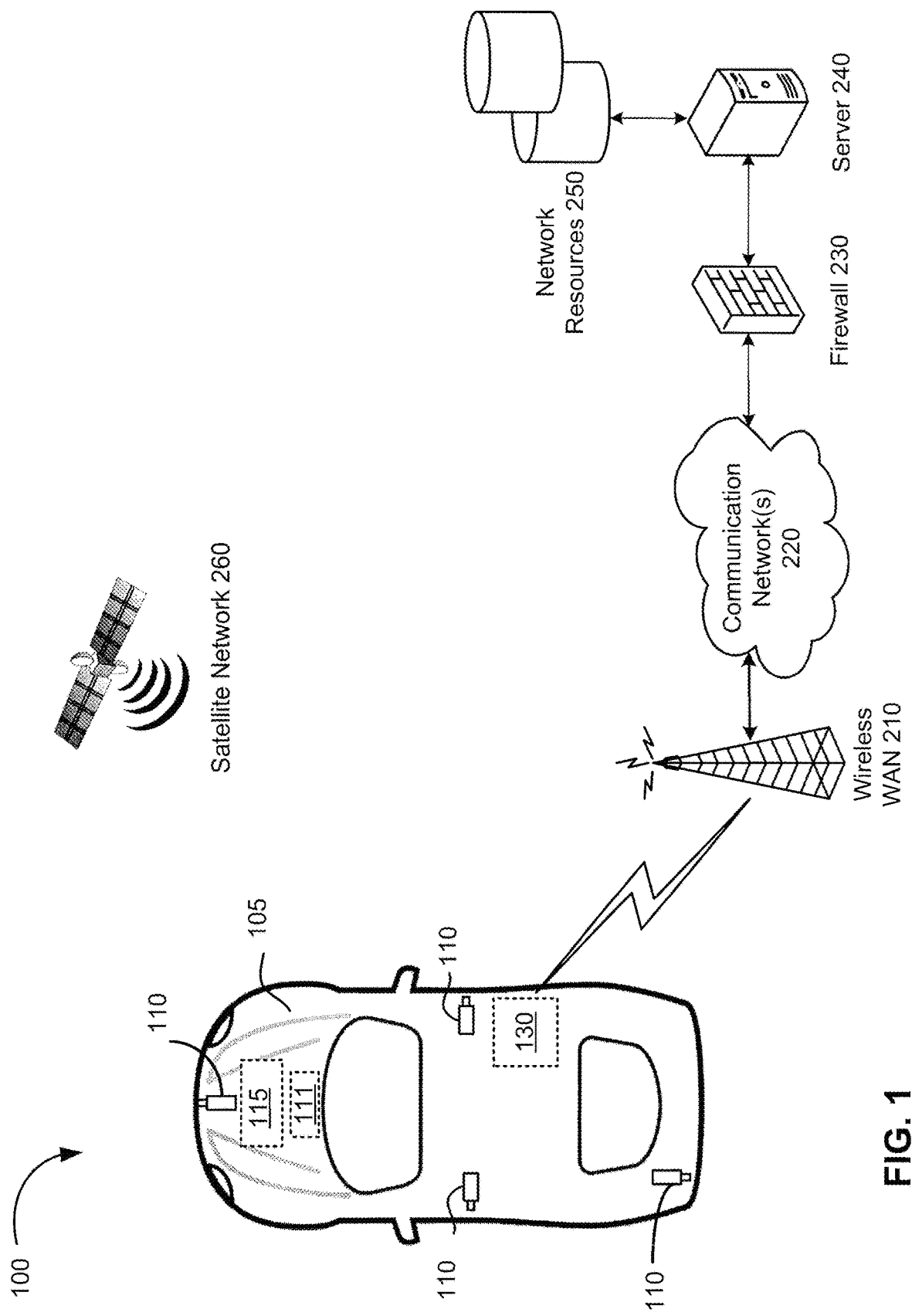
FIG. 1 is a schematic diagram of a communication system suitable for practicing example embodiments of the present disclosure.

The following is a list of selected acronyms and associated definitions that appear in this description:
AC Action Conditioned
ACC Adaptive Cruise Control
Action A control decision for interacting with the environment realized by actuators
ADAS Advanced Driver-Assistance System
CoG Center of Gravity
FIS Fuzzy Inference System
GVF General Value Function
MPC Model Predictive Controller
MCTS Monte Carlo Tree Search
RL Reinforcement Learning
RPM Rotations Per Minute
State A representation of the environment constructed from a collection of sensors
TD Temporal Difference The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

For convenience, the present disclosure describes example embodiments of methods and systems with reference to a motor vehicle, such as a car, truck, bus, boat or ship, submarine, aircraft, warehouse equipment, construction equipment, tractor or other farm equipment. The teachings of the present disclosure are not limited to any particular type of vehicle, and may be applied to vehicles that do not carry passengers as well as vehicles that do carry passengers. The teachings of the present disclosure may also be implemented in mobile robot vehicles including, but not limited to, autonomous vacuum cleaners, rovers, lawn mowers, unmanned aerial vehicle (UAV), and other objects.

Example embodiments are described for systems and methods that can adaptively control spacing between a moving object such as a vehicle and adjacent objects such as other vehicles. Some example embodiments are directed to solving the problem of travelling at a desired speed in either high-speed or low-speed traffic conditions while ensuring a vehicle operates safely and avoids collisions and unsafe situations with other objects including vehicles. In some examples, an enhanced adaptive cruise control (ACC) system is provided that may improve safety and, in some embodiments, comfort, through pro-active consideration of the risk of rear-end and, in some embodiments, side-impact collisions. In some examples, the pro-active consideration of a collision risk is used to anticipate a need to slow down or speed up the vehicle in order to drive defensively.

In example embodiments, the problem of safe vehicle spacing is addressed by a method and system for adaptively controlling spacing of an ego vehicle between front and back vehicles to avoid collisions and unsafe situations both in front of and behind the ego vehicle. In example embodiments, environmental conditions surrounding an ego vehicle (including the spacing between the ego vehicle and any front and back vehicles) are monitored and used to predict how future actions can impact safety. These predictions are then used to select an action that optimizes safety of the ego vehicle while achieving other objectives such as a maintaining a target speed of the ego vehicle.

In at least some examples, predictive functions used to make predictions are trained via reinforcement learning (RL) using the general value function (GVF) framework. An example of a GVF framework that can be implemented in example embodiments is described in: "R. Sutton, J. Modayil, M. Delp, T. Degris, P. Pilarski, A. White and D. Precup, "Horde: A scalable real-time architecture for learning knowledge from unsupervised sensorimotor interaction," in *Proc. of 10th Intl. Conf. on Autonomous Agents and Multiagent Systems*, Taipei, Taiwan, 2011." Reinforcement learning enables a way of dealing with the stochastic and unknown behavior of other vehicles by learning from experience, including observing changes in behavior of other vehicles and the impact that has on safety. An example of RL is described in: D. Silver, A. Huang, C. Maddison, A. Guez, L. Sifre, G. Driessche, J. Schrittwieser, I. Antonoglou and V. Panneershelvam, "Mastering the game of Go with deep neural networks and tree search," Nature, vol. 529, no. 7587, pp. 484-489, 2016.

In at least some examples, in addition to safety predictions, perceived occupant comfort can also be predicted for different types of actions, and a particular action selected to optimize safety and comfort. Furthermore, in addition to environmental conditions such as spacing and speed, in at least some examples other environmental conditions such as road conditions and weather conditions are used in making safety and comfort predictions.

Figure 2:
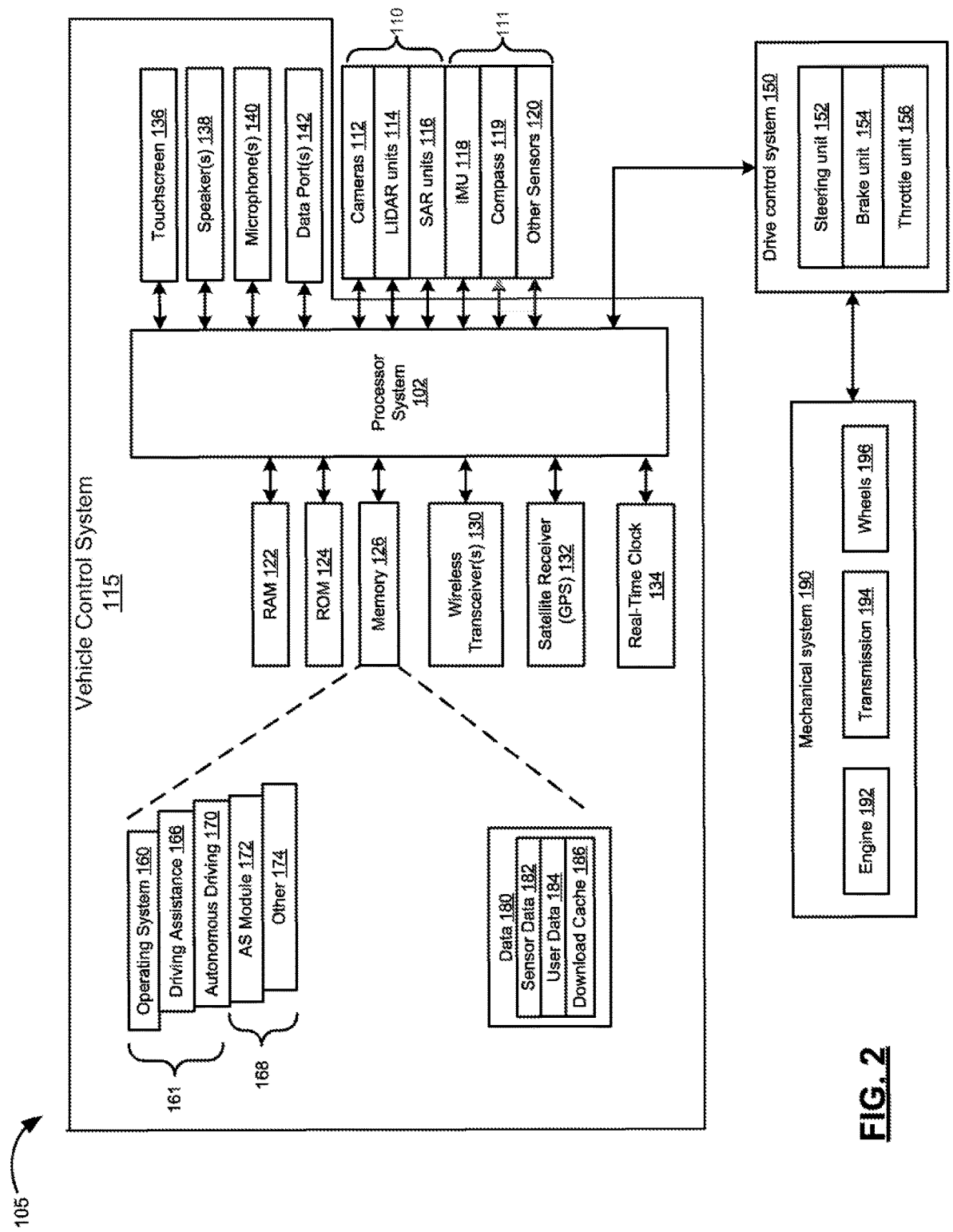
FIG. 2 is a block diagram of a vehicle comprising a vehicle control system in accordance with one example embodiment of the present disclosure.

FIG. 1 is a schematic diagram showing selected components of a system 100 in accordance with one example embodiment of the present disclosure. The system 100 comprises user equipment in the form of a vehicle control system 115 embedded in vehicles 105 (only one of which is shown in FIG. 1). The vehicle control system 115, shown in greater detail in FIG. 2, is coupled to a drive control system 150 and a mechanical system 190 of the vehicle 105, as described below. The vehicle control system 115 can in various embodiments allow the vehicle 105 to be operable in one or more of a fully-autonomous, semi-autonomous or fully user-controlled mode.

The vehicle 105 includes a plurality of electromagnetic (EM) wave based sensors 110 that collect information about the external environment surrounding vehicle 105, and a plurality of vehicle sensors 111 that collect information about the operating conditions of the vehicle 105. EM wave based sensors 110 may for example include digital cameras 112 that provide a computer vision system, light detection and ranging (LIDAR) units 114, and radar units such as synthetic aperture radar (SAR) units 116. Cameras 112, LIDAR units 114 and SAR units 116 are located about the vehicle 105 and are each coupled to the vehicle control system 115, as described below. In an example embodiment, the cameras 112, LIDAR units 114 and SAR units 116 are located at the front, rear, left side and right side of the vehicle 105 to capture information about the environment in front, rear, left side and right side of the vehicle 105. The cameras 112 LIDAR units 114 and SAR units 116 are mounted or otherwise located to have different fields of view (FOVs) or coverage areas to capture information about the environment surrounding the vehicle 105. In some examples, the FOVs or coverage areas of some or all of the adjacent EM wave based sensors 110 are partially overlapping. Accordingly, the vehicle control system 115 receives information about the external environment of the vehicle 105 as collected by cameras 112, LIDAR units 114 and SAR units 116. In at least some examples, the coverage areas are divided into zones, including for example a front zone, a back zone, and side zones.

Vehicle sensors 111 can include inertial measurement unit (IMU) 118, an electronic compass 119, and other vehicle sensors 120 such as a speedometer, a tachometer, wheel traction sensor, transmission gear sensor, throttle and brake position sensors, and steering angle sensor. The vehicle sensors 111, when active, repeatedly (e.g., in regular intervals) sense information and provide the sensed information to the vehicle control system 115 in real-time or near real-time. The vehicle sensors 111 can include an IMU 118 that senses the vehicle's specific force and angular rate using a combination of accelerometers and gyroscopes. The vehicle control system 115 may collect information about a position and orientation of the vehicle 105 using signals received from a satellite receiver 132 and the IMU 118. The vehicle control system 115 may determine a linear speed, angular speed, acceleration, engine RPMs, transmission gear and tire grip of the vehicle 105, among other factors, using information from one or more of the satellite receivers 132, the IMU 118, and the vehicle sensors 111.

The vehicle control system 115 may also comprise one or more wireless transceivers 130 that enable the vehicle control system 115 to exchange data and optionally voice communications with a wireless wide area network (WAN) 210 of the communication system 100. The vehicle control system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 is connected to network resources 250, such as supplemental data sources that may be used by the vehicle control system 115.

The communication system 100 comprises a satellite network 260 comprising a plurality of satellites in addition to the WAN 210. The vehicle control system 115 comprises the satellite receiver 132 (FIG. 2) that may use signals received by the satellite receiver 132 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

FIG. 2 illustrates selected components of the vehicle 105 in accordance with an example embodiment of the present disclosure. As noted above, the vehicle 105 comprises a vehicle control system 115 that is connected to a drive control system 150 and a mechanical system 190 as well as to the sensors 110, 111. The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processor system 102 that is coupled to a plurality of components via a communication bus (not shown) which provides a communication path between the components and the processor 102. The processor system 102 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network 210, a satellite receiver 132 for receiving satellite signals from the satellite network 260, a real-time clock 134, and a touchscreen 136. The processor system 102 may include one or more processing units, including for example one or more central processing units (CPUs), one or more graphical processing units (GPUs) and other processing units.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations (one of which is shown in FIG. 1) of the wireless WAN 210 (e.g., cellular network) within its geographic coverage area. The one or more wireless transceiver(s) 130 may send and receive signals over the wireless WAN 210. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The real-time clock 134 may comprise a crystal oscillator that provides accurate real-time time information. The time information may be periodically adjusted based on time information received through satellite receiver 132 or based on time information received from network resources 250 executing a network time protocol.

The touchscreen 136 comprises a display such as a color liquid crystal display (LCD), light-emitting diode (LED) display or active-matrix organic light-emitting diode (AMOLED) display, with a touch-sensitive input surface or overlay connected to an electronic controller. Additional input devices (not shown) coupled to the processor 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The system may also include other sensors such as tire pressure sensors (TPSs), door contact switches, light sensors, proximity sensors, etc.

The drive control system 150 serves to control movement of the vehicle 105. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, receives navigation instructions from an autonomous driving system 170 (for autonomous driving mode) or a driving assistance system 166 (for semi-autonomous driving mode) and generates control signals to control one or more of the steering, braking and throttle of the vehicle 105. The drive control system 150 may include additional components to control other aspects of the vehicle 105 including, for example, control of turn signals and brake lights.

The mechanical system 190 receives control signals from the drive control system 150 to operate the mechanical components of the vehicle 105. The mechanical system 190 effects physical operation of the vehicle 105. The mechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 is rendered and displayed on the touchscreen 136 by the processor 102. A user may interact with the GUI using the touchscreen and optionally other input devices (e.g., buttons, dials) to select a driving mode for the vehicle 105 (e.g. fully autonomous driving mode or semi-autonomous driving mode) and to display relevant information, such as navigation information, driving information, parking information, media player information, climate control information, etc. The GUI may comprise a series of traversable content-specific menus.

The memory 126 of the vehicle control system 115 has stored thereon a number of software systems 161 in addition to the GUI, where each software system 161 includes instructions that may be executed by the processor 102. The software systems 161 includes an operating system 160, the driving assistance software system 166 for semi-autonomous driving, and the autonomous driving software system 170 for fully autonomous driving. Both the driving assistance software system 166 and the autonomous driving software system 170 can include one or more of a navigation planning and control module, a vehicle localization module, parking assistance module, and autonomous parking module. The memory 126 also has stored thereon other software modules 168 that can be invoked by either the driving assistance software system 166 or the autonomous driving software system 170. The other software modules 168 include an adaptive spacing (AS) module 172 and other modules 174. Other modules 174 include for example mapping module, navigation module, climate control module, media player module, telephone module and messaging module. The adaptive spacing module 172, when executed by the processor 102, causes the operations of methods described herein to be performed.

Although the AS module 172 is shown as a separate module that can be invoked by the driving assistance software system 166 for semi-autonomous driving and/or the autonomous driving software system 170, one or more of the other modules 168, including AS module 172, may be combined with one or more of the other software modules 174 in some embodiments.

The memory 126 also stores a variety of data 180. The data 180 may comprise sensor data 182 sensed by the sensors 110, user data 184 comprising user preferences, settings and optionally personal media files (e.g., music, videos, directions, etc.), and a download cache 186 comprising data downloaded via the wireless transceivers 130, including for example data downloaded from network resources 250. The sensor data 182 may comprise image data from the cameras 112, LIDAR data from the LIDAR units 114, RADAR data from the SAR units 116, and other sensor data from other vehicle sensors 120. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

Figure 3:
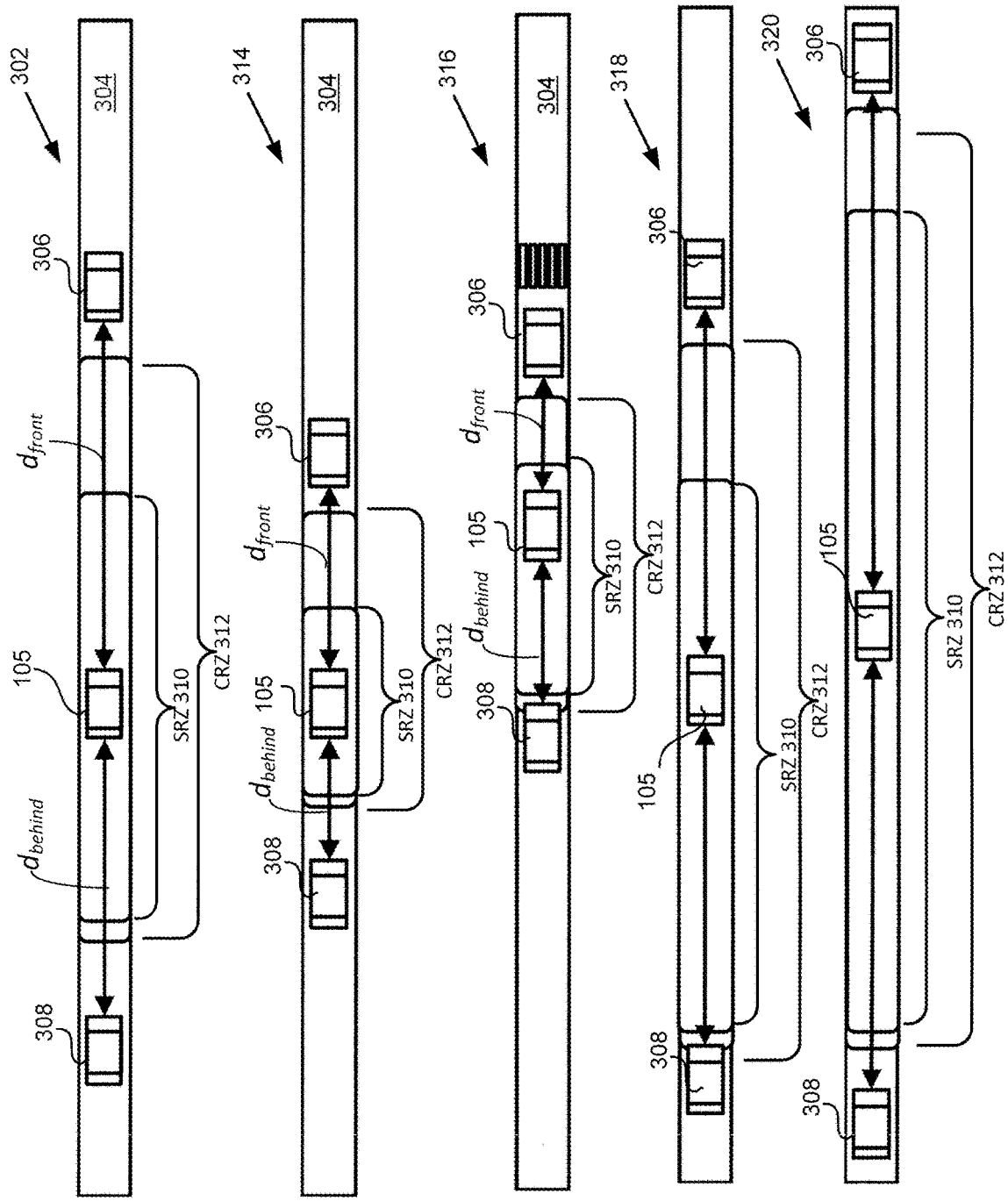
FIG. 3 is illustrates different inter-vehicle spacing scenarios.

In example embodiments, the vehicle control system 115 of vehicle 105 (referred to hereinafter as ego vehicle 105) is configured by adaptive spacing module 172 to implement an adaptive spacing predictive (ASP) control system to adaptively control spacing between the ego vehicle and other vehicles. In this regard, FIG. 3 shows examples of different spacing scenarios that may be addressed by the vehicle control system 115. Scenario 302 illustrates a normal highway driving with the ego vehicle 105 travelling on roadway 304 between a leading front vehicle 306 and a trailing back vehicle 308. In example embodiments there are two overlapping risk zones identified for the ego vehicle 105. One zone, indicated by bracket 310 is a safety risk zone (SRZ) and the other zone, indicated by bracket 312 is a comfort risk zone (CRZ). The SRZ 310 should be free of any other vehicles in order to allow all three vehicles to safely stop based on criteria such as current speed and road conditions. The size of SRZ 310 is based on objective safety criteria. In example embodiments, the SRZ 301 is treated as a set of safety zones, including front safety risk zone and a back safety risk zone. CRZ 312 also can includes a front comfort risk zone and a back comfort risk zone that should be free of any other vehicles in order to allow vehicle occupants, for example occupants of the ego vehicle 105, to have a desired comfort level. For example, CRZ 312 could be determined based on one or more subjective criteria, including for example the distance required to provide a comfortable deceleration rate for a vehicle occupant and/or a distance that is visually perceived as safe by vehicle occupants. In example embodiments, the CRZ 312 extends further both in front of and behind the ego vehicle 105 than the SRZ 310. Although the CRZ 312 may not be provided for in all embodiments, in at least some embodiments the extent to which the dimensions of the CRZ 312 exceed the dimensions of the SRZ 310 may be user configurable.

As shown in normal highway driving scenario 302, the spacing distance $d_{front}$ between the leading front vehicle 306 and the ego vehicle 105 and the spacing distance $d_{behind}$ between the trailing back vehicle 308 and the ego vehicle 105 both safely exceed the SRZ 310 and the CRZ 312 of the ego vehicle 105.

Scenario 314 represents slow-speed driving, which as shown in FIG. 3 permits a smaller SRZ 310 and CRZ 312 than normal highway driving scenario 302. Scenario 316 represents a situation in which the lead front vehicle 306 and the ego vehicle 105 are stopped and the back vehicle 308 continues to approach. In this scenario, unlike the previous scenarios, the SRZ 310 and CRZ 312 each extend further behind the ego vehicle 105 than they extend in front of it.

Scenario 318 represents a situation in which the back vehicle 308 is speeding and going faster than the ego vehicle 105, resulting in SRZ 310 and CRZ 312 each extending further behind the ego vehicle 105 than would be the case if the back vehicle were not speeding. Scenario 320 represents snow and/or ice driving conditions, resulting in SRZ 310 and CRZ 312 each being larger than they would be in dry conditions.

In example embodiments the ASP control system of ego vehicle 105 is configured to continuously predict the SRZ 310 and the CRZ 312 by monitoring the environment around the ego vehicle 105 and operating state of the ego vehicle 205, predict what actions are most likely to keep other vehicles out of the CRZ 312 and the SRZ 310 (with the SRZ 310 having the higher priority) while maintaining a target speed, and undertake the action(s) predicted as having the greatest likelihood of success. In at least some operational scenarios these actions may accomplish one or more of the following: (a) reducing the risk of rear-end collisions within the speed limits of the road by introducing information about the trailing back vehicle 308 (e.g. the vehicle located behind the ego vehicle 105); (b) exercise defensive actions early enough to avoid collisions by anticipating sudden behavior changes as a possibility (even if remotely possible) by other drivers by making probabilistic predictions about safety and comfort; (c) provide a framework for improving comfort of passengers in addition to safety.

First Example of Adaptive Spacing Predictive (ASP) Control System

Figure 4:
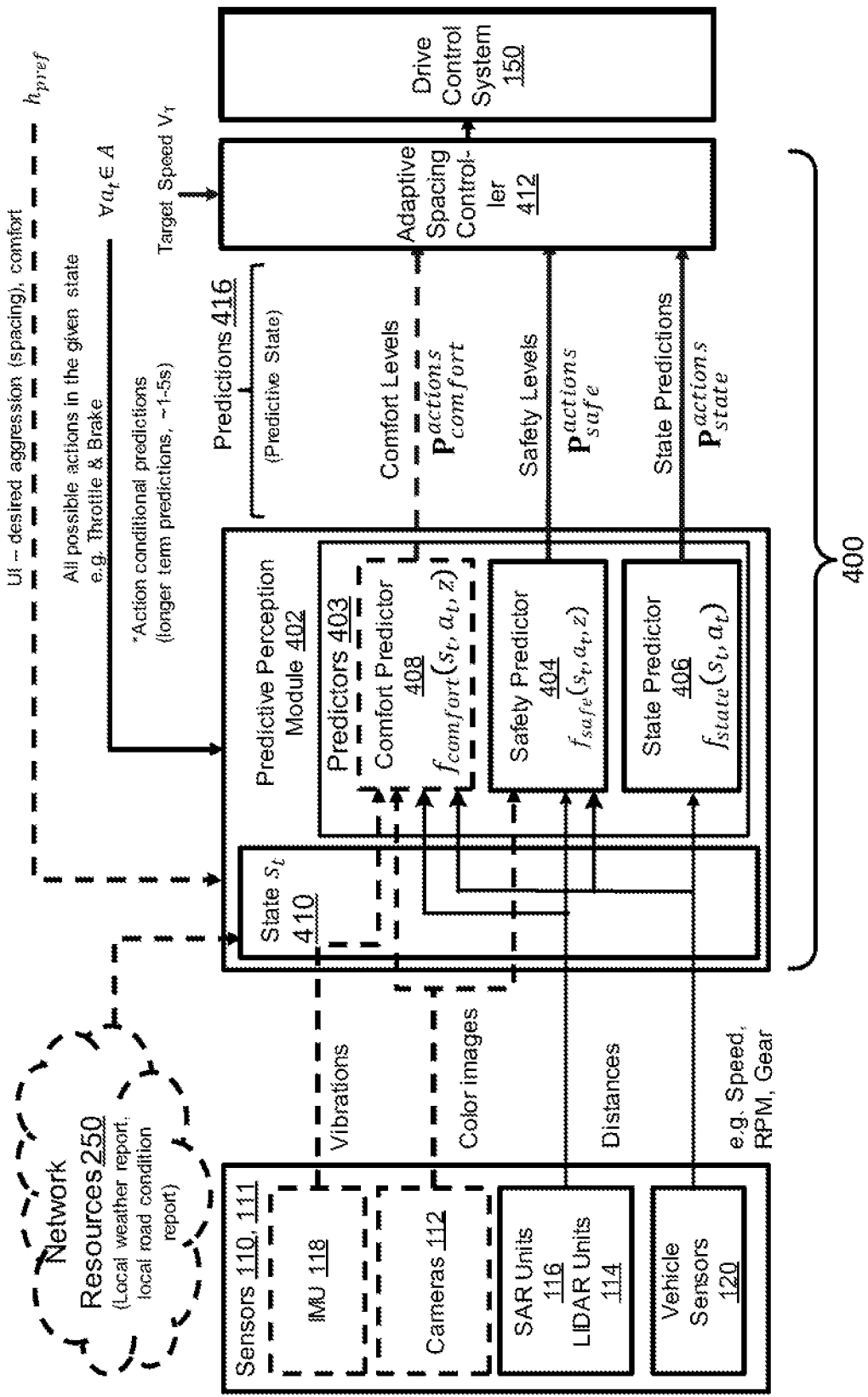
FIG. 4 is a block diagram of an adaptive spacing control system according to an example embodiment.

FIG. 4 illustrates a block diagram of an adaptive spacing predictive (ASP) control system 400 implemented by vehicle control system 115 under the control of adaptive spacing module 172. ASP control system 400 receives inputs from the EM wave based sensors 110 and the vehicle sensors 111, and controls actuators of the drive control system 150 (e.g. brake unit 154 and throttle unit 156). The ASP control system 400 includes a predictive perception module 402 and an adaptive spacing (AS) controller module 412.

The predictive perception module 402 includes a state sub-module 410 and a set of predictor sub-modules 403. The state sub-module 410 receives information from the EM wave based sensors 110, the vehicle sensors 111, and external sources (e.g. network resources 250) and continuously determines a representation of a current state of the ego vehicle 105 and its environment at a current time t. Information used by the state sub-module 410 to construct a representation of the current state of the ego vehicle 105 and its environment at a current time t may for example include distance information provided by front and back SAR units 116 (radar) and LIDAR units 114. Front and back SAR units 116 (radar) and LIDAR units 114 provide distance information about objects or obstacles, both in front of and behind the ego vehicle 105. In some examples, side SAR units 116 and LIDAR units 114 can also be included to obtain information such as side clearance information. In example embodiments, other vehicle sensors 120 including speedometers, tachometers and transmission gear sensors, provide information about speed, engine RPM and transmission gear, respectively, to state sub-module 410. Cameras 112 gather images about the environment of the vehicle 105. IMUs 118, which include accelerometers and gyroscopes, measure vehicle linear and angular acceleration/deceleration and vehicular vibrations. Cameras 112 generate images that can be used with an image-based classifier to provide current state information on the drivability of the road surface (e.g. gravel, asphalt, concrete, wet asphalt, snow, ice etc.). In some embodiments, the predictive state sub-module 410 can receive information from external data sources such as those available through network resources 250, including for example local weather and local road condition reports available in the cloud. Other vehicle sensors 120 that measure current throttle and brake position are also included to provide information to state sub-module 410.

The set of predictor sub-modules 403 includes safety predictor sub-module 404, state predictor sub-module 406 and, in at least some examples, an optional comfort predictor sub-module 408. The current overall state constructed by the state sub-module 410 is continually used by these predictor sub-modules 403 to determine a set of action conditioned (AC) predictions 416 about the effects of various actions on the environment of ego vehicle 105. The AC predictions 416 are action conditioned in that the predictions indicate a predicted future state that is conditional on a certain action occurring.

The AC predictions 416 are provided to the AS controller module 412, which selects a suitable action to achieve one or more target objectives based on the AC predictions 416. Accordingly, predictive perception module 402 provides a set of action-conditioned predictions 416 that effectively form an interactive model of the environment surrounding the ego vehicle 105, providing the AS controller module 412 with the input needed for it to manipulate the vehicle 105 (e.g. throttle or brake) within its environment to minimize a defined cost function or maximize total reward.

State sub-module 410 will now be described in greater detail. The state constructed by state sub-module 410 includes a current vehicle state $s_t \in S$, where S represents a set of physical parameters about the current environment of the ego vehicle 105, as measured by other vehicle sensors 120, including for example speed v, engine RPM, current engine gear, current throttle position, current brake position, and distances to any obstacles in any risk zone directions (e.g. $d_{back}$, $d_{front}$).

Figure 5:
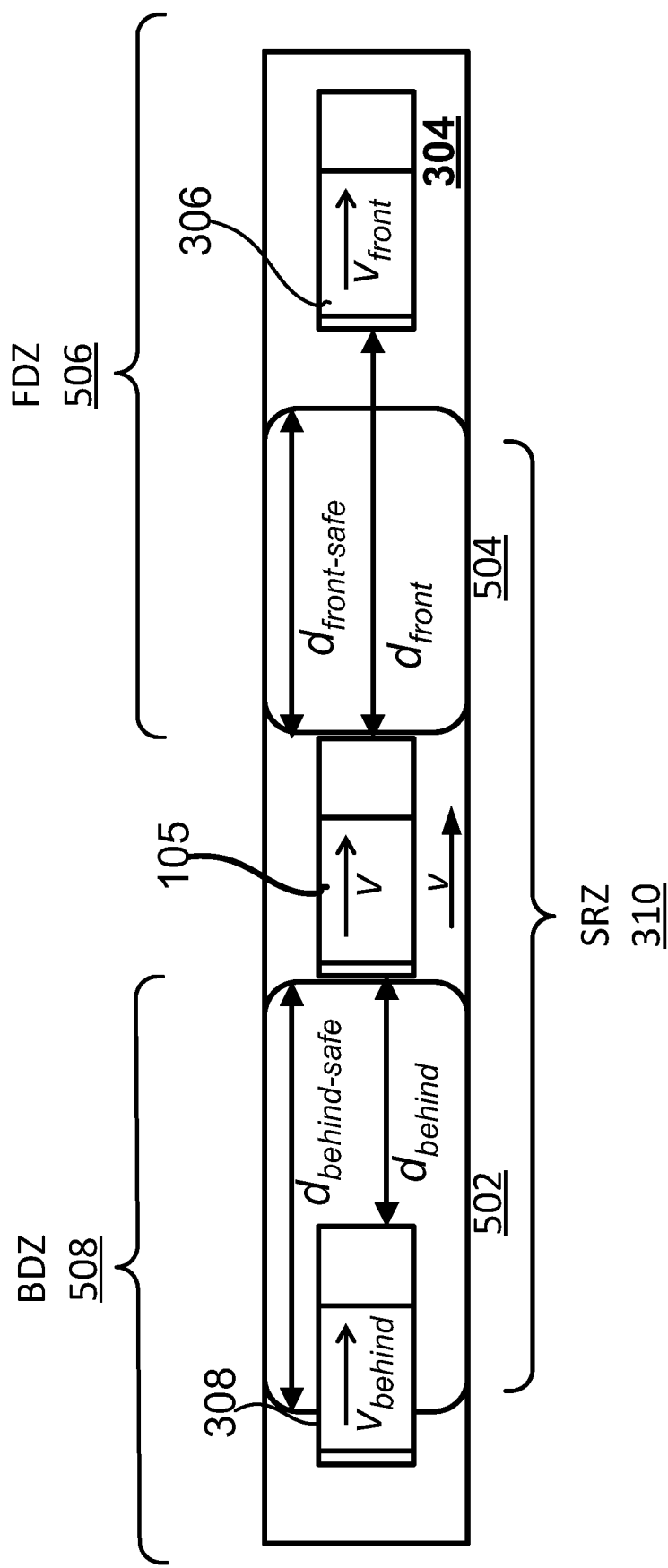
FIG. 5 illustrates a further inter-vehicle spacing scenario.

In at least some example embodiments, state sub-module 410 also constructs other categories of state information in addition to the vehicle state $s_t$, namely current safely state (safe), calculated based on one or more safety state functions, and, optionally, current comfort state (comfort), calculated based on one or more comfort state functions. In some examples, current safety state and current comfort state are calculated only when training predictor sub-modules 403—for example, the current safety state and current comfort state can be used to generate a cumulant signal (pseudo-reward signal) for training safety and comfort GVFs respectively (safety and comfort GVFs, used in example embodiments to implement the safety and comfort predictor sub-modules 404, 408 are described in greater detail below). In an example embodiment, a zone-specific safety state safe is determined for each of a plurality of safety risk zones z. For example, as shown in FIG. 5, the SRZ 310 of ego vehicle 105 includes a front safety risk zone 504 and a back safety risk zone 504. Other zones may be defined (for example side risk zones) and the different zones may overlap.

In one example, safety state safe is a function that maps parameters concerning current vehicle state $s_t \in S$, parameters concerning safety $h_{pref}^{safe} \in H_{safe}$ and the risk zone $z \in Z$, represented at follows:

$$\text{safe}: S \times H_{safe} \times Z \rightarrow [0,1] \quad (1)$$

The output of the safety state function is a value between 0 and 1 that indicates the safety level of the ego vehicle 105 for the specific safety risk zone, where 1 is safe and 0 is unsafe. In an example embodiment, the front safety risk zone 504 function is defined as:

$$\text{safe}(s_t, h_{pref}^{safe}, \text{FRONT}) = \begin{cases} 1 & \text{if } d_{front} > d_{front-safe} \\ 0 & \text{otherwise} \end{cases} \quad (2)$$

In equation (2), it is assumed that the ego vehicle 105 is travelling forward and the vehicle 306 in front is travelling in the same direction, $d_{front}$ is the distance from the ego vehicle 105 to the front vehicle 306 (as measured in real-time by one or more of LIDAR units 114 and SAR units 116) and $d_{front-safe}$ is a safety threshold. Although different safety thresholds can be used in different embodiments to set preferred safety parameters ($h_{pref}^{safe} \in H_{safe}$), in one example, a standard spacing approach is used such that $d_{front-safe} = vt_{spacing} + d_{min}$ where v is the speed of the ego vehicle 105, $t_{spacing}$ represents a predefined safe time threshold spacing between vehicles 105, 306 and $d_{min}$ is a predefined minimum safe distance between vehicles 105, 306 when stopped. In another example where the ego vehicle 105 is travelling in reverse and the vehicle in front is travelling in the same direction, we simply swap v, the speed of the ego vehicle, with $v_{front}$, the speed of the vehicle in front such that $d_{front-safe} = v_{front} t_{spacing} + d_{min}$. In t still another example where the ego vehicle 105 and vehicle in front are travelling toward each other where one possible threshold is $d_{front-safe} = vt_{spacing} + v_{front} t_{spacing} + d_{min}$ where the speeds are absolute speeds that are always non-negative regardless of the direction of travel (forward or reverse).

Typically, the useful range of the EM sensors 110 of the ego vehicle 105, including for example front SAR units 116 and front LIDAR units 114, for detecting a leading vehicle 304 in front of the ego vehicle 105 is limited to a forward detection zone (FDZ) 506 that is larger than the front SRZ 504. In some examples, the FDZ may be defined by environmental conditions, or may be defined by a set distance, or a combination of both. In example embodiments, if there is no vehicle 306 (or other obstacle) detected in front of the ego vehicle 105 within the FDZ 506 then $d_{front}$ is deemed to be $> d_{front-safe}$ and the front safety risk zone 504 of the ego vehicle 105 is safe (e.g. safe($s_t, h_{pref}^{safe}$, FRONT)=1).

In example embodiments, the predefined safety thresholds $t_{spacing}$ and $d_{min}$ can be based, within limits, on user input preferences $h_{pref}$. For example, a user of ego vehicle 105 may be able to adjust an aggression level by selecting between a "sport" driving mode and a "touring" driving mode.

Similarly, the back safety risk zone 502 function is defined as:

$$\text{safe}(s_t, h_{pref}^{safe}, \text{BACK}) = \begin{cases} 1 & \text{if } d_{back} > d_{back-safe} \\ 0 & \text{otherwise} \end{cases} \quad (3)$$

In equation (3), it is assumed that the ego vehicle 105 is travelling forward, the back vehicle 308 is travelling in the same direction, and $d_{back}$ is the distance from the ego vehicle 105 to the back vehicle 308 (as measured in real-time by one or more of LIDAR units 114 and SAR units 116) and $d_{back-safe}$ is a safe distance threshold. Although different threshold calculations can be used, in an example embodiment the safe distance threshold is calculated as $d_{back-safe} = v_{back} t_{spacing} d_{min}$ where $v_{back}$ is the speed of the back vehicle 308 (either measured or calculated from changes in distance measurements), $t_{spacing}$ is a predefined safe-time inter-vehicle spacing threshold, $d_{min}$ is a predefined safe inter-vehicle threshold when stopped. The safety preference thresholds $t_{spacing}$ and $d_{min}$ can be different for the front and back zones 504, 502; different values for $t_{spacing}$ can be used for example. The reason for using the speed of the back vehicle 308 in the safety calculation is to estimate the safe following distance of the back vehicle 308. The back vehicle 308 may be travelling faster than the ego vehicle 105 and under this circumstance the back safety risk zone 502 is expanded appropriately. For the case where the ego vehicle 105 is travelling in reverse and the back vehicle 308 is travelling in the same direction, we simply swap $v_{back}$, the speed of the vehicle behind, with v, the speed of the ego vehicle such that $d_{back-safe} = vt_{spacing} + d_{min}$. When the ego vehicle 105 and back vehicle 308 are travelling toward each other where on possible threshold is $d_{back-safe} = vt_{spacing} + v_{back} t_{spacing} + d_{min}$ where the speeds are absolute speeds that are always non-negative regardless of the direction of travel (forward or reverse).

As with front SAR units 116 and front LIDAR units 114, the back SAR units 116 and back LIDAR units 114 also have a limited range back detection zone (BDZ) 508 for detecting a trailing back vehicle 308 behind the ego vehicle 105. In some examples, the BDZ may be defined by environmental conditions, or may be defined by a set distance, or a combination of both. In example embodiments, if there is no trailing back vehicle 308 (or other obstacle) detected within the BDZ 506 then $d_{back}$ is deemed to be $>d_{back\text{-}safe}$ and the back safety risk zone 502 of the ego vehicle 105 is safe (e.g. safe($s_t,h_{pref}^{safe}$,BACK)=1).

Although only the functions for front and back safety zones 504, 502 are set out above, states could also be calculated for other possible zones z, including for example: an omni-directional safety risk zone (safe or unsafe in all directions); and other specific spatial zones/areas around the vehicle, including for example side zones.

A zone specific comfort state function is similarly represented as:

$$\text{comfort}: S \times H_{comfort} \times Z \rightarrow [0,1] \quad (4)$$

The output is a value between 0 and 1 that indicates the comfort level of the ego vehicle 105 (in relation to a specific zone) where 1 is comfortable and 0 is uncomfortable. The comfort function can be expert defined or learned via machine learning. In an example embodiment, the front comfort function is defined as $$\text{comfort}(s_t, h_{pref}^{comfort}, \text{FRONT}) = \begin{cases} 1 & \text{if } d_{front} > d_{front-comfort} \\ 0 & \text{otherwise} \end{cases} \quad (5)$$

where $d_{front\text{-}comfort}$ can be calculated a number of different ways, including for example using the calculations similar to that described above for $d_{front\text{-}safe}$, with larger values for a safe inter-vehicle time spacing threshold and minimum inter-vehicle stop distance threshold. The back comfort function is defined similarly as:

$$\text{comfort}(s_t, h_{pref}^{comfort}, \text{BACK}) = \begin{cases} 1 & \text{if } d_{back} > d_{back-comfort} \\ 0 & \text{otherwise} \end{cases} \quad (6)$$

In example embodiments, the state sub-module 410 is also configured to determine a set of all possible actions A that can be taken by the ego vehicle 105 given the current vehicle state $s_t$. In some examples, the set of actions may include all actions possible at defined intervals within a future time duration, for example all actions possible at each second within for the next 5 seconds. In example embodiments, the actions $a_t$ in the set A will each specify one or both of an amount of brake actuation (e.g. −1=full brake to 0=full brake) and an amount of throttle actuation (e.g. 0=no throttle to +1=full throttle).

In some embodiments, the functions used to determine the safety and comfort states and set of actions A are defined based on algorithms and criteria set by human experts. In some examples, one or both of the safety and comfort thresholds (for example $t_{spacing}$ and $d_{min}$) may be based, within defined safety limits, on user input preferences ($h_{pref}^{safe}, h_{pref}^{comfort}$), and/or may be automatically adjusted based on road and weather conditions received through network resources 250, or based on road surface conditions as sensed by cameras 112. In some embodiments, one or more of the functions used to determine safety and comfort states and set of actions A are defined based on machine learning algorithms trained through reinforcement learning (RL) (see for example the above identified papers by R. Sutton et. Al. and D. Silver et. al.). In some embodiments, the functions are determined by a combination of human expert input and machine based RL.

Figure 6:
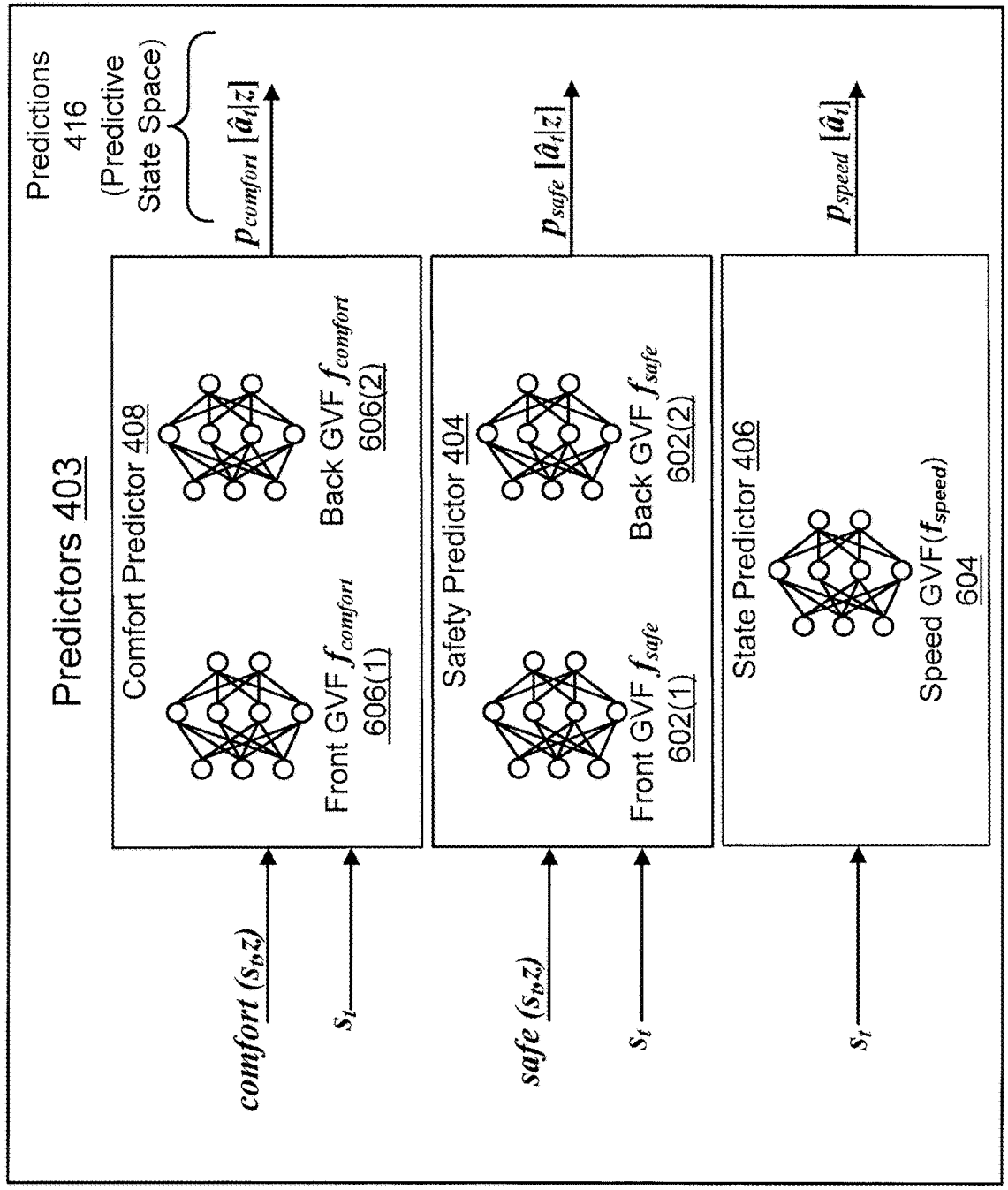
FIG. 6 is a block diagram of predictor modules of the adaptive spacing control system of FIG. 4.

The vehicle state $s_t$ (and, optionally, in at least some embodiments, zone based safety state safe($s_t$,z) and zone based comfort state comfort($s_t$,z)) is used by safety, state and comfort predictor modules 404, 406 and 408, which will now be described in greater detail with reference to FIG. 6. In some embodiments, the functions used by each of the predictor modules 404, 406, 408 of the predictive perception module 402 to generate predictions 416 are defined based on machine learning algorithms trained through reinforcement learning (RL) (see for example the above identified papers by R. Sutton et. Al. and D. Silver et. al.). In some embodiments, the functions are determined by a combination of human expert input and machine based RL.

In example embodiments each of the predictor modules 404, 406 and 408 includes one or more predictors in the form of one or more trained neural networks that are implemented using one or more GPUs of the processor system 102 of vehicle control system 115. In some examples, a separate neural network is used for each predictor, although in some embodiments at least some layers of a neural network may be used for multiple predictors—for example in some embodiments it is possible that one or more or all predictors may share the same inputs (state) along with 1 or more layers, meaning that it is possible for all predictors to be implemented in a single neural network with multiple diverging output branches for each prediction.

The neural network (NN) based predictors can be trained using different methods, however in an example embodiment RL is used to determine GVFs for each of the NN based predictors (also referred to herein as predictor GVFs).

In at least some example embodiments, the predictive perception module 402 includes a total of $|Z_{safe}|+|Z_{comfort}|+1$ predictors, where $|Z_{safe}|$ is the number of safety risk zones, $|Z_{comfort}|$ is the number of comfort risk zones, and the extra predictor is for vehicle state predictions. In the particular example shown in FIG. 6, the safety predictor sub-module 404 includes $|Z_{safe}|=2$ predictors, corresponding to a front SRZ predictor GVF 602(1) and a back SRZ predictor GVF 602(2). The comfort predictor sub-module 408 also includes $|Z_{comfort}|=2$ predictors, corresponding to a front CRZ predictor GVF 606(1) and a back CRZ predictor GVF 606(2). The state predictor module sub-module 406 includes a single predictor, namely a speed predictor GVF 604. In other embodiments, additional predictors can be added for additional safety or comfort zones, and for additional state prediction functions. In some embodiments, the comfort predictor module 508 and its corresponding predictors can be omitted.

The state predictor sub-module 406 is configured to predict, based on the current vehicle state $s_t$, future vehicle states ($P_{state}^{actions}$) that will result from different actions $\hat{a}_t$. The state predictor sub-module 406 is implemented as NN predictor GVF 604 that maps current state $s_t \in S$, and next action $a_t \in A$ as shown:

$$f_{state}: S \times A \rightarrow S_{sub} \quad (7)$$

where $S_{sub} \subseteq S$.

In one example the state predictor GVF 604 is configured to predict future speeds of the ego vehicle 105 for each of a plurality of possible actions (e.g. different degrees of throttling and braking). In some examples, predicting the speed of the ego vehicle 105 may be important to achieve a target speed objective. Accordingly, in the embodiment of FIG. 6, $S_{sub}$ contains simply speed, and the state predictor GVF 604 is a speed predicting function $f_{speed}$ that predicts the speed of the ego vehicle $p_{speed}[\hat{a}_t]$. In example embodiments, the possible actions A are defined on the interval [−1,+1] where −1 is full braking and +1 is full throttle. In other examples, the action space can be represented using different variables—for example different variables could be used to represent the intervals[0,+1] for each of braking and throttle.

In example embodiments, the specific vehicle state $s_t$ information input to speed predictor GVF $f_{speed}$ 604 to predict the speed of the ego vehicle 105 includes: current speed of the vehicle; RPM of the vehicle's engine; gear of the vehicle's transmission; and amount of throttle or braking applied. Details of an example embodiment of state predictor sub-module 406 as speed predictor GVF $p_{speed}$ [$â_t$] 604 is described in greater detail below.

In example embodiments, the safety predictor sub-module 404 is configured to predict, based on the current vehicle state $s_t$, future vehicle safety predictions $p_{safe}$ [$â_t$|z] that represent the results from different actions $â_t$. As noted above, the safety predictor sub-module 404 includes a predictor GVF for each safety zone, illustrated in the example of FIG. 6 as front SRZ predictor GVF $f_{safe}$ 602(1) and a back SRZ predictor GVF $f_{safe}$ 602(2). In some examples, the safety prediction $p_{safe}$ for a safety risk zone indicates a probability that, based on a specific action, the safety risk zone will be free of both static and moving obstacles (such as another vehicle) at a predetermined future time. For example, referring to FIG. 5, the presence of trailing back vehicle 308 in the back SRZ 502 would be classified as unsafe. In some examples, predicted zone safety is represented as a probability value normalized between 0 and 1, where 0 is unsafe (e.g. 100% certain an obstacle will be in the risk zone) and 1 is safe (e.g. 100% certain no obstacle will be in the risk zone).

The front SRZ predictor GVF $f_{safe}$ 602(1) and back SRZ predictor GVF $f_{safe}$ 602(2) map current state, safety preferences $h_{pref}^{safe} \in H_{safe}$, safety risk zone (SRZ) $z \in Z$, and next action $a \in A$ as shown:

$$f_{safe}: S \times A \times H_{safe} \times Z \rightarrow [0,1] \quad (8)$$

The outputs of the front SRZ predictor GVF $f_{safe}$ 602(1) and a back SRZ predictor GVF $f_{safe}$ 602(2) are scalars that represent the probability of being safe in the front and back SRZs respectively.

In an example embodiment, the specific information from the state space ($s_t$) required to predict safety for the front or back SRZs are, for a given time t:

Current speed v of the ego vehicle

Distance from the ego vehicle 105 to the target vehicle in each zone z ($d_{front}$ for z=front SRZ; $d_{back}$ for z=back SRZ)

Direct and/or indirect measurement of speed of target vehicle in each zone (for example change in distance between given time t and previous sample time t−1 to the target vehicle in each zone z, and/or direct radar unit speed measurement of target vehicle in each zone)

Direct and/or indirect measurement of acceleration of target vehicle in each zone (for example change in distance over three sample periods, and/or direct radar unit acceleration measurement of target vehicle in each zone z Amount of throttle or braking applied at time t for the ego vehicle 105 (for example, on an interval of [−1,+1] where throttle and brake are represented by a single variable, or separate intervals of [0,+1] where throttle and brake are each represented as a separate variable.

In some examples, the current safety safe ($s_t$,z) may optionally also be included as an input to the safety predictor GVFs 602(1) and 602(2). Example processes for training the front SRZ predictor GVF $f_{safe}$ 602(1) and a back SRZ predictor GVF $f_{safe}$ 602(2) to learn predictions are described in greater detail below.

In embodiments that include comfort predictor sub-module 408, the comfort predictor sub-module 408 can be configured in the same manner as safety predictor sub-module 404, except that comfort predictor sub-module 408 makes predictions in respect of comfort risk zones rather than safety risk zones. In this regard, comfort predictor sub-module 408 is configured to predict, based on the current vehicle state $s_t$, future vehicle comfort predictions $p_{comfort}$ [$â_t$|z] that represent the results from different actions $â_t$. In some example embodiments, comfort predictor sub-module 408 may optionally also receive the current comfort state comfort($s_t$,z) as an input. Comfort predictor sub-module 408 includes a predictor GVF for each comfort zone, illustrated in the example of FIG. 6 as front CRZ predictor GVF $f_{comfort}$ 606(1) and a back CRZ predictor $f_{comfort}$ GVF 606(2). In some examples, the comfort prediction $p_{comfort}$ for a zone indicates a probability that, based on a specific action, the comfort zone will be free of both static and moving obstacles (such as another vehicle). Similar to safety predictions, comfort predictions can be represented as a normalized probability value between 0 and 1 where 0 is uncomfortable and 1 is comfortable. Comfort may be measured as distance from other vehicles in a manner analogous to safety; however, other comfort measures can be predicted including vibration levels and deceleration/acceleration force. Any combination of comfort definitions may be used. In the case of comfort being defined as maintaining a certain distance from another vehicle, the CRZ will typically be larger than the SRZ 310.

The front CRZ predictor $f_{comfort}$ GFV 606(1) and a back CRZ predictor GVF $f_{comfort}$ 606(2) map current state, comfort preferences $h_{pref}^{comfort} \in H_{comfort}$, safety risk zone (SRZ) $z \in Z$, and next action $\alpha \in A$ as shown:

$$f_{comfort}: S \times A \times H_{comfort} \times Z \rightarrow [0,1] \quad (9)$$

The outputs of the front CRZ predictor GVF $f_{comfort}$ 606(1) and back CRZ predictor GVF $f_{comfort}$ 606(2) are scalars that represent the probability of being comfortable in the front and back CRZs respectively. In at least some examples, the state space information used by the comfort predictors can be the same as those disclosed above in respect of the safety predictors except that the current comfort state comfort($s_t$,z) is used in place of the current safety state. Further details of training the front CRZ predictor GVF $f_{comfort}$ 606(1) and back CRZ predictor GVF $f_{comfort}$ 606(2) are described below.

As described above, the predictive perception module generates AC predictions 416 that include multiple predictions about the environment of the ego vehicle 105, which include state (speed) predictions $p_{speed}$ [$â_t$], safety predictions $p_{safe}$ [$â_t$|z], and comfort predictions $p_{comfort}$ [$â_t$|z], that collectively provide a predictive state space $p_t \in P$ for the AS controller module 412. All of these predictions are action conditional "what-ifs" that can be used to evaluate the impact that different actions will have on safety, comfort and vehicle state (e.g. vehicle's speed). The mapping performed by predictor sub-modules 403 from the state space $s_t \in S$ to the predictive state space $p_t \in P$ can be represented as:

$$p: S \rightarrow P \quad (10)$$

In an example embodiments, predictive state space $p_t \in P$ that is constructed by the predictor sub-modules 403 can be represented as a matrix of n×m predictions, one for each possible action $â_t^{(0)}, â_t^{(1)}, â_t^{(2)}, \ldots â_t^{(n)}$ in state $s_t$ where there are m predictor GVF functions and n=|A| actions available. In the example described above m=5 as there are five predictor functions, namely: speed predictor GVF $f_{speed}$ speed 604; front SRZ predictor GVF $f_{safe}$ 602(1) and a back SRZ predictor GVF $f_{safe}$ 602(2); and front CRZ predictor GVF $f_{comfort}$ 606(1) and back CRZ predictor GVF $f_{comfort}$ 606(2).

An example of predictive state space matrix is given by the following matrix for m=3 (the 2 comfort predictors are omitted in the following example for ease of representation):

$$p(s_t|h_{pref}^{safe}) = \qquad (11)$$

$$p_t = \begin{bmatrix} f_{speed}(s_t, \hat{a}_r^{(0)}) & & f_{speed}(s_t, \hat{a}_t^{(n)}) \\ f_{safe}(s_t\hat{a}_t^{(0)}, h_{pref}^{safe}, \text{FRONT}) & \cdots & f_{safe}(s_t\hat{a}_t^{(n)}, h_{pref}^{safe}, \text{FRONT}) \\ f_{safe}(s_t\hat{a}_t^{(0)}, h_{pref}^{safe}, \text{BACK}) & & f_{safe}(s_t\hat{a}_t^{(n)}, h_{pref}^{safe}, \text{BACK}) \end{bmatrix}$$

The predictions represented in the matrix, at time t, denoted by $p_t$ are supplied to the AS controller module 412, which determines a next vehicle action. In example embodiments, the AS controller module 412 is configured to select a next action to optimize safety and, in at least some configurations, comfort, while balancing safety and comfort objectives with objectives of reaching the destination quickly and within boundaries such as speed limits. In this regard, AS controller module 412 must implement actions that attempt to avoid both front-end and rear-end collisions and thereby improve safety of the ego vehicle 105 while operating on the road, while attempting to maintain a target speed. In some examples embodiments, AS controller module 412 receives AC predictions 416 from the predictive perception module 402 and selects an action, for example an extent to which the vehicle 105 should throttle or brake. The actions selected by the AS controller module 412 are provided to the drive control system 150 to control actuators (for example brake unit 154 and throttle unit 156) of the ego vehicle 105 to control vehicle operation within its environment.

Accordingly, in example embodiments, the AS controller module 412 makes use of predictions about the environment when making control decisions. The AS controller module 412 is represented by the following mapping function:

$$f_{control}: S \times P \rightarrow A \qquad (12)$$

The function $f_{control}$ maps the current state $s_t$ and current predictive state $p_t$ to a next action $a_t$. To simplify notation, in the following description the rows of the matrix $p_t$ are respectively denoted as $p_{speed}[\hat{a}_t]$, $p_{front-safe}[\hat{a}_t]$, and $p_{back-safe}[\hat{a}_t]$ respectively where action $\hat{a}_t$ indexes the column of the matrix.

In one example the AS controller module 412 is implemented using a fuzzy inference system (FIS) that applies simple, linguistically understandable rules to select a next action. However, as will be described in greater detail below, in other examples the AS controller module 412 may be implemented using other control methodologies, for example MPC, PID, or other rule-based methods.

In an example where AS controller module 412 is implemented using an FIS, the AS controller module 412 seeks to find an action to satisfy the condition represented by the following linguistic statement:

Front is Safe AND Back is Safe AND Speed is
Close to Target (13)

The condition represented by this statement can be considered as a maximization problem, however maximization is just one defuzzification approach that can be used. Denoting the fuzzy sets as $S_{front}[\hat{a}_t]$, $s_{back}[\hat{a}_t]$ and $T_{speed}[\hat{a}_t]$ respectively and indexing by actions, the condition above can be written more formally as:

$$G[\hat{a}_t] = S_{front}[\hat{a}_t] \wedge S_{back}[\hat{a}_t] \wedge T_{speed}[\hat{a}_t] \qquad (14)$$

where $\wedge$ is a standard t-norm operator (common t-norms are min or product) and $G[\hat{a}_t]$ is the goal fuzzy set.

There are many ways to add comfort to the condition, however, in one example embodiment the AS controller 412 is configured to maximize the following statement:

Front is Comfortable AND Back is Comfortable
AND Front is Safe AND Back is Safe AND
Speed is Close to Target (15)

An example embodiment that considers vehicle speed predictions $p_{speed}[\hat{a}_t]$, and vehicle safety predictions $p_{front-safe}[\hat{a}_t]$ and $p_{back-safe}[\hat{a}_t]$ (but not vehicle comfort) will be now be described in greater detail. In an example embodiment, the fuzzy inference performed by AS controller 412 defines fuzzy sets which map predictions to graded truth values as follows:

Front safety $SAFE_{front}:[0,1] \rightarrow [0,1]$
Back safety $SAFE_{back}:[0,1] \rightarrow [0,1]$
Closeness to Target Speed $TARGET_{speed}:S_{speed} \rightarrow [0,1]$ where the target speed is the desired speed $V_T$ supplied externally such as set through a cruise control user interface or supplied by other components in an adaptive cruise control system or autonomous driving system. These fuzzy sets can be implemented in various ways, including being learned via machine learning. In the presently described example, a manual specification and optimization of the fuzzy sets is utilized to evaluate the predictors $p_{speed}[\hat{a}_t]$, $p_{front-safe}[\hat{a}_t]$, and $p_{back-safe}[\hat{a}_t]$. The following constraints are applied on the definition of the fuzzy sets: (1) the support of each fuzzy set should contain the entire action space otherwise there may be scenarios where there is no suitable action found; and (2) in order to ensure front safety is more important than back safety, $SAFE_{front} \subseteq SAFE_{back}$ which means the truth values of the front set must be less than the truth values for the back set across the entire domain.

Functions applied using FIS at the AS controller 412 for mapping from predictions to fuzzy truth values can be represented as:

$$S_{front}[\hat{a}_t] = SAFE_{front}(p_{front-safe}[\hat{a}_t])^{r_{front-safe}} \qquad (16)$$

$$S_{back}[\hat{a}_t] = SAFE_{back}(p_{back-safe}[\hat{a}_t])^{r_{back-safe}} \qquad (17)$$

$$T_{speed}[\hat{a}_t] = TARGET_{speed}(p_{speed}[\hat{a}_t])^{r_{speed}} \qquad (18)$$

The result of the inference is a fuzzy set that characterizes the entire condition statement identified above as equation (13). In each of the (16), (17) and (18), the fuzzy sets are raised to a power (e.g. $r_{front-safe}$ in (16), $r_{back-safe}$ in (17) and $r_{speed}$ in (18) which represents the priority or importance of the terms in the AS controller 412. The powers can be considered as having a similar role to "adverbs" in language as they modify the meaning of safety and closeness to target speed. A value greater than 1 represents the linguistic term "very", a value of 1 represents no change, a value between 0 and 1 represents the linguistic term "somewhat" and a value of 0 disables the term from the controller 412.

This fuzzy set denotes the membership value of each action that satisfies the statement. To produce a final action, defuzzification is applied to the goal fuzzy set $G[\hat{a}_t]$ to select a single best action In an example embodiment, a center of gravity approach (CoG) is used to provide smooth control output and determine next action $a_t$. A global power r is applied to the goal fuzzy set $G[\hat{a}_t]$ in the CoG calculation to control the overall responsiveness of the controller; this provides a way to choose an action by taking the soft-max of expression (15) where a value of r=1 achieves the classical center of gravity (CoG) approach and a value greater than 1 achieves a result that approaches the maximum function (i.e. a soft-max function). The next action is simply calculated as a weighted average of the actions over all the membership values, i.e.

$$a_t = \sum_{\forall \hat{a}_t \in A} \frac{G[\hat{a}_t]^r \hat{a}_t}{G[\hat{a}_t]^r} \qquad (19)$$

In an example embodiment, once a next action $a_t$ is determined, the action is communicated to the appropriate actuator of drive control system 150 for implementation. In example embodiments, the next action $a_t$ can specify either an amount of throttle to be applied by throttle unit 156 or an amount of braking that should be applied by the braking unit 154.

Figure 7:
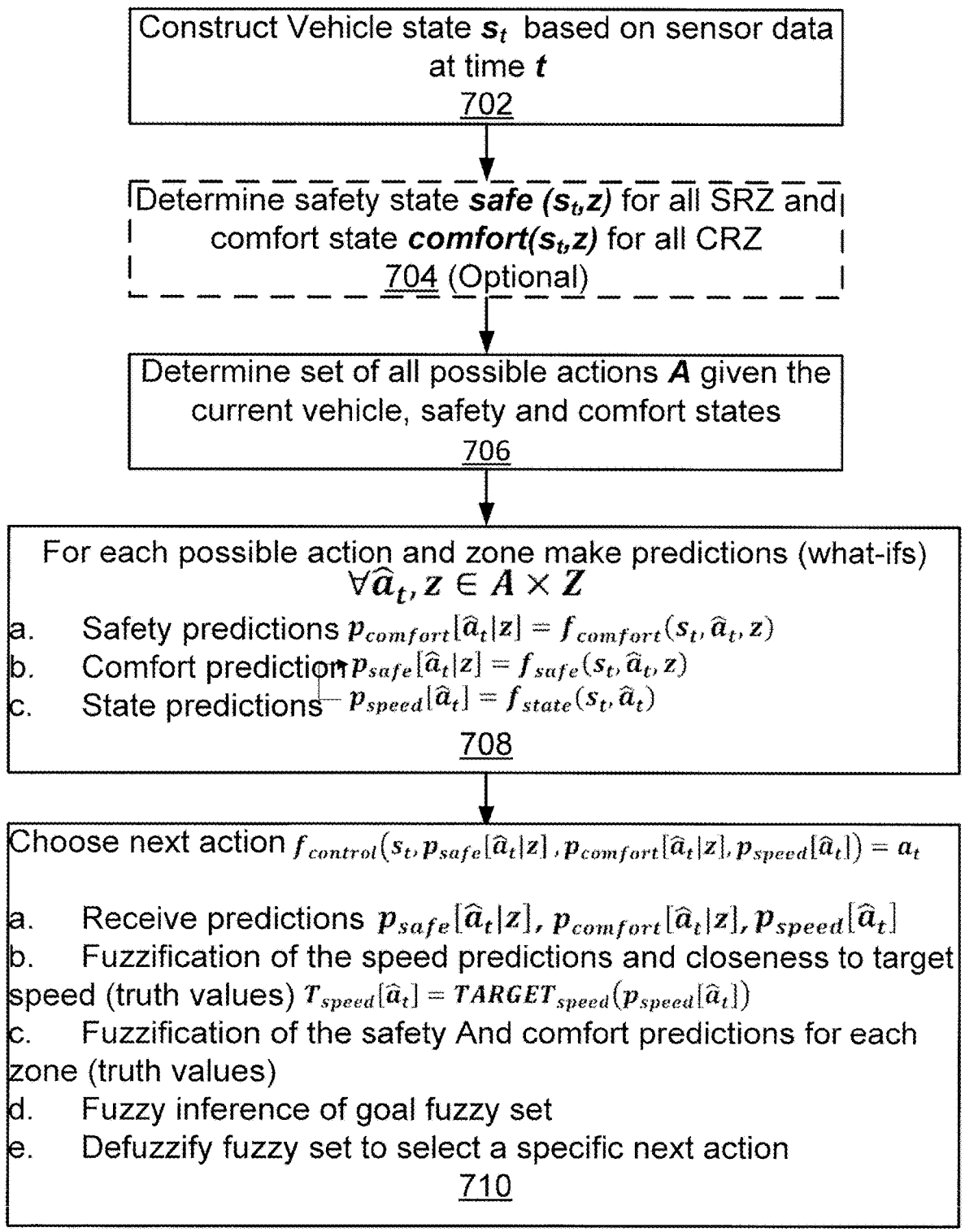
FIG. 7 is a flow diagram of an example of a method performed by the adaptive spacing control system of FIG. 4.

FIG. 7 provides summary of an adaptive spacing control method that is repeated periodically by ASP control system 400 at times t1, t2, t3, . . . , tn. In an example embodiment, the method of FIG. 7 is performed at a frequency of 20 hz such that times t1, t2, t3, . . . correspond to t1, t1+50 ms, t1+100 ms, etc. As a first step, the state sub-module 410 maps data from sensors 125 to construct vehicle state $s_t$ at the current time t (Block 702). In embodiments where the current safety state and current comfort state are used for predictions, the state sub-module 410 then determines a current safety state safe($s_t$,z) for all safety risk zones and a current comfort state comfort($s_t$,z) for all comfort risk zones (z∈Z)(Block 704). The state sub-module 410 also determines a set of all possible future actions A at predetermined time in the future (for example the current time t plus 50 ms), given the current state $s_t$ (Block 706). By way of example, the action set A could specify a set of possible throttle and brake actuation values on a scale from −1 (full break) to +1 (full throttle).

The current vehicle state $s_t$, and current action set A (and optionally current safety state safe($s_t$,z) and current comfort state comfort($s_t$,z)) are provided to the predictive perception module 402 which, the makes AC predictions 416 (∀$\hat{a}_t$, z∈A×Z), for each zone, for each possible action (Block 708). In the illustrated example, the predictions include: (a) safety predictions $p_{safe}[\hat{a}_t|z] = f_{safe}(s_t,\hat{a}_t,z)$, generated by safety predictor sub-module 404; (b) comfort predictions $p_{comfort}[\hat{a}_t|z] = f_{comfort}(s_t,\hat{a}_t,z)$, generated by comfort predictor sub-module 408; and (c) state predictions, which in the present example are speed predictions $p_{speed}[\hat{a}_t] = f_{state}(s_t,\hat{a}_t)$ generated by the state predictor sub-module 406.

The predictions 416 are provided to AS controller 412, which then chooses the next action $a_t$ as represented by the function: $f_{control}(s_t,p_{safe}[\hat{a}_t|z],p_{comfort}[\hat{a}_t|z],p_{speed}[\hat{a}_t]) = a_t$ (Block 710). In the present example, the AS controller 412 performs the following five steps:

(a) Receive predictions of state (speed) $p_{speed}[\hat{a}_t]$, safety $p_{safe}[\hat{a}_t|$FRONT$]$ and $p_{safe}[\hat{a}_t|$BACK$]$;

(b) Perform fuzzification of the speed predictions and closeness to target speed (truth values) $T_{speed}[\hat{a}_t] =$ TARGET$_{speed}(p_{speed}[\hat{a}_t])^{r_{speed}}$;

(c) Perform fuzzification of the safety and comfort predictions for each zone (truth values):

$s_{front}[\hat{a}_t] = $SAFE$_{front}(p_{front-safe}[\hat{a}_t])^{r_{front-safe}}$;

$s_{back}[\hat{a}_t] = $SAFE$_{back}(p_{back-safe}[\hat{a}_t])^{r_{back-safe}}$;

$C_{front}[\hat{a}_t] = $COMFORT$_{front}(p_{front-comfort}[\hat{a}_t])^{r_{front-comfort}}$;

$C_{back}[\hat{a}_t] = $COMFORT$_{back}(p_{back-comfort}[\hat{a}_t])^{r_{back-comfort}}$;

(d) perform fuzzy inference of goal fuzzy set where ∧ is a t-norm $G[\hat{a}_t] = s_{front}[\hat{a}_t] \wedge s_{back}[\hat{a}_t] \wedge T_{speed}[\hat{a}_t] \wedge C_{front}[\hat{a}_t] \wedge C_{back}[\hat{a}_t]$; and (e) Defuzzify the $G(\hat{a}_t)$ fuzzy set to select a specific next action $a_t$.

In example embodiments, the drive control system 150 is instructed to perform the next action $a_t$.

Speed Predictor Learning

An example of training the neural network speed predictor GVF $f_{speed}$ 604 of speed predictor sub-module 406 will now be described. In example embodiments, the speed predictor GVF $f_{speed}$ 604 is configured using RL based on methodology disclosed in the above identified mentioned paper by R. Sutton et al. When constructing a GVF to implement predictor GVF $f_{speed}$ 604, a cumulant (pseudo-reward) function, pseudo-termination function, and target policy are each defined. In an example embodiment, this is treated as a RL problem with a constant pseudo-termination function called the discount factor γ. The discount factor controls the time horizon for the predictions such that:

$$\Delta t = \frac{1}{1-\gamma} \qquad (20)$$

where Δt is the number of time steps into the future for the prediction.

The cumulant for predicting speed is:

$$c_t = v_t(1-\gamma) \qquad (21)$$

where $v_t$ is the current measured velocity of the vehicle, and γ is the discount factor. The correction factor 1−γ normalizes the sum of all future cumulants such that the total return $f_{speed}(s_t,a_t)$ is:

$$f_{speed}(s_t, a_t) = \sum_{t=0}^{\infty} c_t \gamma^t = (1-\gamma) \sum_{t=0}^{\infty} v_t \gamma^t = \frac{\sum_{t=0}^{\infty} v_t \gamma^t}{\sum_{t=0}^{\infty} \gamma^t} \qquad (22)$$

Thus, with this normalization factor, $f_{speed}(s_t,a_t)$ represents a weighted average of all future speeds meaning that $f_{speed}(s_t,a_t) \cong \tilde{v}_{t+\Delta t}$.

In one example embodiment, a target policy of $\pi(a_t|s_t) = 1$ for all actions $a_t$ and states $s_t$ can be used for a scenario where selecting an appropriate target policy may be more challenging than building a simple versatile policy for data collection purposes. Defining an expert policy for data collection and training can result in more stable learning than using traditional off-policy learning with a specified target policy. In at least some cases, data collection and learning can be done with a human expert driver, which can be advantageous since defining a target policy with traditional off-policy RL learning is rather challenging.

Although a number of different data collection and training (DCT) systems are possible, an example of a simple DCT system for speed predictor GVF $f_{speed}$ 604 learning will now be described. Coverage (via exploration) of the state and action space is desirable to learn a meaningful predictor. The DCT system may be provided with training data based on actual collected data, simulated data, or a combination thereof. In one example, the DCT system operates based on simulated data as follows:

For each time step t, the following Action is generated:
Action=Act(State)
1. If vehicle state is stopped
   a. Action=draw a uniformly random positive acceleration from [0,1]
2. Noise=draw a uniformly random value from [−0.1,+0.1]
3. Action=Action+Noise
4. Return Action This process results in accelerating behavior where the amount of acceleration varies slowly over time followed by braking when the Action becomes negative, which provides more data for acceleration than braking. In some training examples, gear shifts are automatically determined according to speed and RPM, although the exact algorithm for shifting gears is not important to the training as long as it does not change from training to deployment. With the above process, a function can learn to predict a probabilistic future speed of the vehicle where the action is assumed to be relatively constant over short periods of time.

Training the speed predictor function $f_{speed}(s_t,a_t)$ 604 is accomplished with state-action-reward-state-action (SARSA) reinforcement temporal difference (TD) learning by first collecting and organizing data as tuples $(s_t,a_t,c_t,s_{t+1},a_{t+1})$ where $c_t$ replaces reward in the standard definition of the SRSA training algorithm such that the target $\hat{f}_{target}$ for standard stochastic backpropagation is defined by:

$$\hat{f}_{target}=c_t+\gamma f(s_{t+1},a_{t+1}) \quad (23)$$

Other learning methods are possible, for example gradient temporal difference (GTD) learning can be used among many others.

Safety Predictors Learning

In example embodiments, training of the safety predictor GVFs is also treated as a function learning problem similar to the speed prediction problem described above. The function to be learned for predicting the front safety is:

$$\tilde{g}_{t+\Delta t}^{(front)}=f_{safe}^{(front)}(s_t,a_t) \quad (24)$$

where $\tilde{g}_{t+\Delta t}^{(front)}$ is the predicted safety at $\Delta t$ time steps into the future as described in equation (20), $s_t$ is a vector that represents the state of the system and $a_t$ is a potential action to be taken.

The function is realized as a standard feed forward neural network. The cumulant for predicting front safety is:

$$c_t^{(front)}=\text{safe}(s_t,h_{pref}^{safe},\text{FRONT})(1-\gamma) \quad (25)$$

where safe $(s_t,h_{pref}^{safe}, z)$ is the current front safety of the vehicle as defined in equation (1), z=FRONT is the direction and $\gamma$ is the discount factor.

The correction factor $1-\gamma$ normalizes the sum of all future cumulants such that the front SRZ predictor GVF $f_{safe}^{(front)}(s_t,a_t)$ 602(1) represents a weighted average of all future front safeties. The back SRZ predictor GVF $f_{safe}^{(back)}(s_t,a_t)$ 602(2) safety predictor is learned identically as the front only replacing z=FRONT with z=BACK.

In the present example embodiment, SARSA learning is selected for training the safety predictor functions for improved learning stability. In addition, the target policy was unknown. Therefore, this necessitated defining an expert policy to collect data rather than using traditional off-policy RL learning. An example of simple safety predictor DCT system to implement a data collection policy for training the safety predictors will now be described according to an example embodiment. Data collection involves creating scenarios such as those shown in FIGS. 3 and 5 with either 2 or 3 vehicles to enable the safety predictor functions to learn to predict safety. A few examples of data collection techniques are summarized in the following table:

TABLE 1

Summary of data collection techniques for training safety predictors

| | Front Vehicle | Middle Vehicle (ego) | Back Vehicle |
|---|---|---|---|
| Learning front safety | Basic controller designed to achieve a random target speed Completely ignores other vehicles on the road | Baseline controller designed to achieve a random target speed and target headway in front | N/A |
| Learning back safety | N/A | Baseline controller designed to achieve a random target speed and target headway behind | Basic controller designed to achieve a random target speed Completely ignores other vehicles on the road |
| Learning front and back safety | Baseline controller designed to achieve a random target speed Vehicle speed is bounded by minimum and maximum back target headway Maximum target headway is a constant to ensure the middle car never stays too far behind Controller responds slowly to changes in the middle vehicle behavior | Random walk action controller similar to the controller used to collect speed data | Baseline controller designed to achieve a random target speed Vehicle speed is bounded by minimum and maximum front target headway Maximum target headway is a constant to ensure the middle car never gets too far away Controller responds slowly to changes in the middle vehicle behavior |

In the examples represented in the above table, the safety predictor DCT system includes two types of DCT controllers, namely a "basic controller" that ignores all other vehicles and only aims to achieve a target speed and a "baseline controller" that aims to achieve a target speed and target headway (e.g. inter-vehicle spacing). Similar to the data collection algorithm described above in respect of the speed predictor, data collection for safety predictor training may, in example embodiments be gathered through actual road data, through simulation, or through a combination thereof. Training data coverage of the entire state and action space is desirable for generalization and, in an example embodiment, is achieved through a slow random walk of each of the controller parameters to simulate sample behaviors under different policies such as very cautious following and tail-gating. In the present example, these parameters are target speed and target headway (e.g. inter-vehicle spacing). It is desirable that the policy remain relatively constant over small periods of time in order to enable the safety predictor to learn to generalize.

The baseline controller of the safety DCT system which implements the training policy used for training the safety GVFs $f_{safe}^{(front)}(s_t,a_t)$ 602(1) and $f_{safe}^{(back)}(s_t,a_t)$ 602(2) is a configured to maintain a target speed and target headway or safe distance simultaneously. In one example, if there are no other cars within the safe distance, the baseline controller follows the target speed. However, if a car approaches from behind or front, the baseline controller will increase or decrease the speed, respectively, to avoid collision. In addition to the acceleration required to achieve the target speed, the baseline controller calculates the acceleration bounds for safe front and back distances:

$$a_v = K_v \times (v_{target} - v)$$

$$a_{max} = a_{d,front} = K_d \times (d_{front} - d_{safe}) + K_v \times (v_{front} - v)$$

$$a_{min} = a_{d,back} = K_d \times (d_{safe} - d_{back}) + K_v \times (v_{back} - v)$$

where $a_v$ is the acceleration needed to achieve target speed; $a_{d,front}$ is the upper bound for acceleration to avoid front collision; $a_{d,back}$ is the lower bound for acceleration to avoid back collision; $d_{safe} = vt_{spacing} + d_{min}$ is desired inter-vehicle distance; and $K_v$ and $K_d$ are tuning parameters for the baseline controller.

The applied acceleration to the vehicle will be $a_v$ bounded by $a_{d,back}$ and $a_{d,front}$. A set of static functions will then map the required acceleration to throttle and brake pedal percentage values. The base-line controller described above is one example of many possible implementations.

With the simple safety predictor DCT system described above, training data is collected and used to train respective SRZ predictor GVFs 602(1), 602(2) that are enabled to predict a probabilistic future safety of the ego vehicle 105 where the action is assumed to be relatively constant over short periods of time. Methods similar to those described above can also be used to train respective CRZ predictor GVFs 606(1), 606(2).

As noted above, other simulation systems or even a human expert can be used to collect the necessary data to train the predictor GVFs, so long as sufficient coverage of the state and action spaces is provided to train a GVF that generalizes well. In example embodiments, during training the DCT system observes diverse enough behaviors and situations to enable the resulting safety and comfort predictor functions to be able to make meaningful predictions. In example embodiments, the behavior of the different vehicles are sufficiently uncorrelated to avoid the introduction of biases that may result in poor or even incorrect predictions. In example embodiments, the safety and comfort GVFs are trained using the same SARSA TD learning rule as specified above in equation (23).

In example embodiments, training occurs offline for greater stability and safety in learning; however, it should be noted that the trained GVFs that implement the predictor functions (once trained) can continuously collect and improve predictions in real-time using off-policy RL learning.

As noted above, comfort can be based on a perception of an inter-vehicle spacing. Other definitions of comfort can be constructed as well including the vibration of the vehicle such as measured by an accelerometer. Vibration can be measured from an accelerometer sensor and the predictive perception module can predict future vibration levels given the set of possible next actions. A fuzzy set captures the mapping of vibration to what the user perceives as comfortable.

In at least some examples, the use of information about a trailing back vehicle in addition to a leading front vehicle may enable AS control system 400 to make safer control decisions that increase safety and reduce risk of collisions including rear-end collisions with the vehicle behind. In addition, the probabilistic predictions of the surrounding safety ensure additional caution is exercised when uncommon but sudden changes in the driving behavior of other vehicles corresponds to patterns observed in previously similar situations. As a result, the AS control system 400, when integrated into an AD system, may operate the ego vehicle 105 more defensively. The use of reinforcement learning to learn to make these predictions may in at least some applications enable more accurate and sensitive longer-term predictions compared to traditional multi-step prediction approaches.

Second Example of Adaptive Spacing Predictive (ASP) Control System

Figure 8:
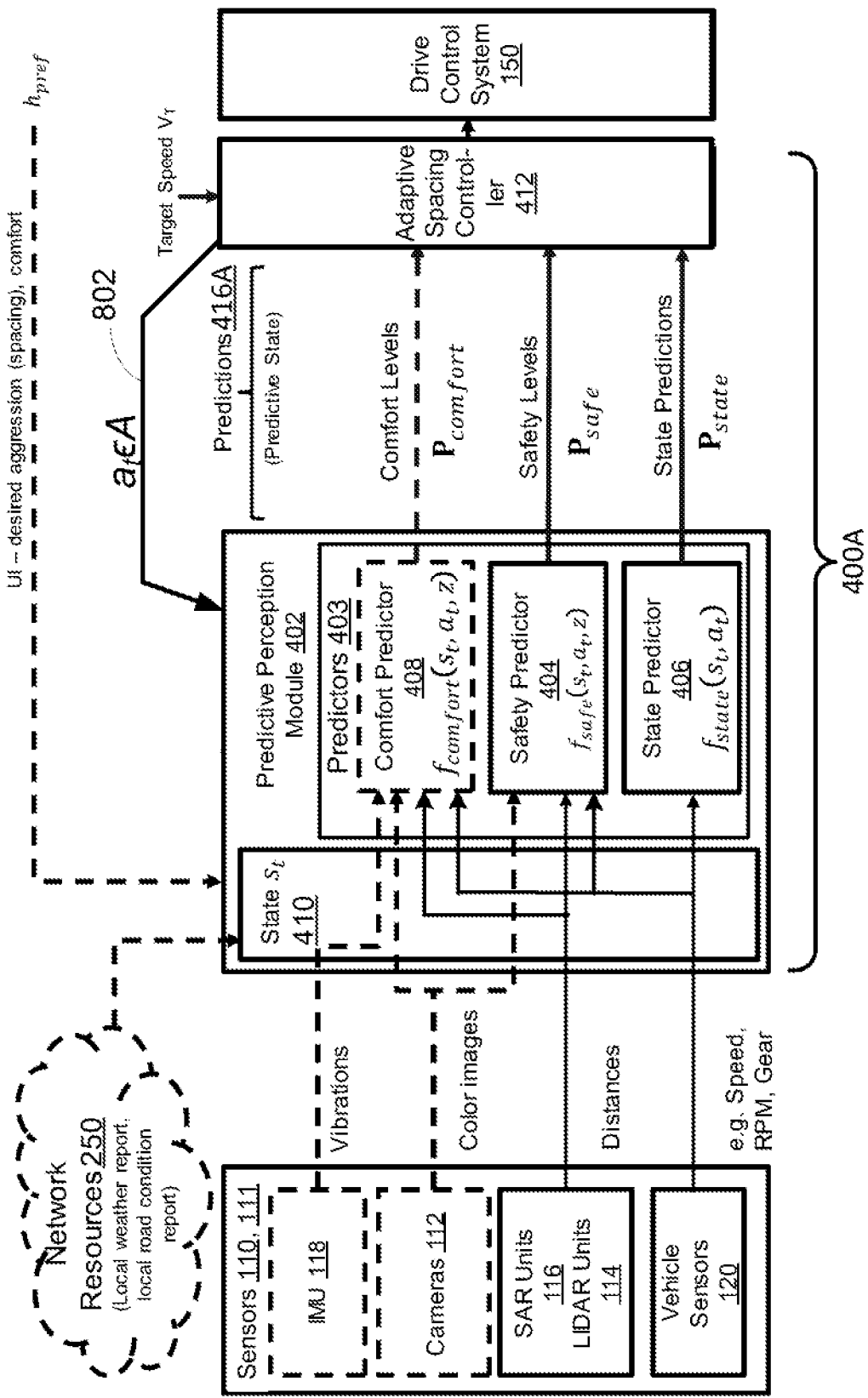
FIG. 8 is a block diagram of an adaptive spacing control system according to a further example embodiment.

A further example embodiment of an ASP control system 400A will now be described with reference to FIG. 8. The ASP control system 400A of FIG. 8 is modified relative to the ASP control system 400 of FIG. 4 to enable RL to be applied directly to the problem of adaptive spacing when training the AS controller module 412. Differences between the ASP control system 400A and the ASP control system 400 are as follows.

In the above description of ASP control system 400, an example of method for training the predictor modules 404, 406 and 408 to make predictions about the environment of ego vehicle 105 is provided. ASP control system 400A differs from ASP control system 400 in the manner in which predictions are generated and passed between the predictive perception module 402 and the AS controller module 412, and in the implementation of the AS controller module 412. In ASP control system 400A, instead of the predictive perception module 402 building a predictive state space with p: S→P, and passing those predictions 416 along to the AS controller module 412, the AS controller module 412 requests predictions from predictive perception module 402 for a given action or set of actions ($a_t \in A$, 802) and the predictive perception module 402 returns the requested predictions 416A, such as shown in FIG. 8.

In the ASP control system 400A, an interactive relationship exists between the predictive perception module 402 and the AS controller module 412 such that the AS controller module 412 requests predictions for actions that it is interested in knowing about. In this regard, the predictions 416A can be considered as an action conditioned predictive state space that is passed from the predictive perception module 402 to the AS controller module 412 with $p_A: S \times A \rightarrow P_A$ such that:

$$p_A(s_t, a_t | h_{pref}^{safe}) = [f_{state}(s_t, a_t), f_{safe}(s_t, a_t, h_{pref}^{safe}, \text{FRONT}), f_{safe}(s_t, a_t, h_{pref}^{safe}, \text{BACK})] \quad (26)$$

where the result is a vector of action conditional predictions $p_A(s_t, a_t | h_{pref}^{safe})$ about state and safety (although not shown in (26), comfort predictions can also be included). One of many possible ways to implement the AS controller 412 of ASP control system 400A is to use reinforcement learning.

In an RL implementation, an action-value function Q is defined that maps state and action spaces (as described in the previous embodiment) to an intermediate action conditional predictive state space $P_A$ and then finally to total discounted return (or action-value), i.e. $Q: S \times A \rightarrow P_A \rightarrow \mathbb{R}$. The function $p_A$ (and in particular, functions for safety, state and comfort predictor modules 404, 406 and 408) can be learned as described above using reinforcement learning and GVFs. Once GVFs for the predictor sub-modules 403 are trained to make accurate predictions, a neural network implemented function for the AS controller 412 can be trained to perform final mapping from $Q_P: P_A \rightarrow \mathbb{R}$ using any number of reinforcement learning methods such as Deep-Q-Network (DQN). Accordingly, a key difference between ASP control system 400 and ASP control system 400A is that for ASP control system 400A, reinforcement learning is applied to train not just the functions of the predictor sub-modules 403, but also to train the control function of the AS controller module 412 to make control decisions.

Although many different reward functions are possible, in an example embodiment, one example of a reward function for RL training the control function of the AS controller module 412 is:

$$r(s_t) = b_1 \text{safe}(s_t, h_{pref}^{safe}, \text{FRONT}) + \qquad (27)$$
$$b_2 \text{safe}(s_t, h_{pref}^{safe}, \text{BACK}) + b_3 e^{-\frac{1}{b_4^2}\|v_t - v_{target}\|^2}$$

where $b_1$, $b_2$, $b_3$, and $b_4$ are constants defining the relative importance of front safety, back safety, and closeness to target speed.

To improve comfort alternative rewards can be considered to penalize strong braking and acceleration such as:

$$r(s_t) = b_1 \text{safe}(s_t, h_{pref}^{safe}, \text{FRONT}) + b_2 \text{safe}(s_t, h_{pref}^{safe}, \text{BACK}) + \qquad (28)$$
$$b_3 e^{-\frac{1}{b_4^2}\|v_t - v_{target}\|^2} + b_5 \text{comfort}(s_t, h_{pref}^{comfort}, \text{FRONT}) +$$
$$b_6 \text{comfort}(s_t, h_{pref}^{comfort}, \text{BACK})$$

where $b_5$, and $b_6$ are additional constants to reward actions that result in better comfort.

Thus, the ASP control system 400A implements decision making policy that can be learned rather than come from specified rules as described above in the FIS implementation of the AS controller 412 in ASP control system 400. However, this comes at the disadvantage that reinforcement learning requires exploration, and ensuring safety during exploration and learning can be challenging.

In one example of the RL-based embodiment of FIG. 8, functions of the predictor sub-modules 403 and the AS controller module 412 are combined into a control-daemon GVF that consists of a two-level hierarchy of GVFs where the first level consists of the predictor GVFs 404, 406, 408 whose outputs are concatenated together in a hidden layer to form a predictive state representation of the environment. A second-level GVF maps the predictive state presentation to a prediction of the discounted return for control purposes. In such an embodiment, ASP control system 400A is constructed as a single neural network that maps state to value with an intermediate layer (the predictive perception module 402) that predicts both safety and state. Thus, the predictive perception module 402 outputs predictions of state and safety and is a subset of the larger neural network that implements the ASP control system 400A. The neural network can be learned in two stages: (a) learn safety and state predictors, (b) learn to predict value for control. The policy is determined using conventional reinforcement learning by selecting actions that maximize the action-value of the control daemon GVF.

Third Example of Adaptive Spacing Predictive (ASP) Control System

A third example embodiment of an ASP control system will now be described, referring again to FIG. 4. The ASP control system according to the third example embodiment is the same as ASP control system 400 of FIG. 4, except that the AS controller 412 is modified to apply model predictive control (MPC) rather than FIS rule-based control.

MPC is regularly applied in industrial applications. In MPC, a mathematical model of the plant/system under control is used to predict the future state of the system over a specific time horizon. The prediction provide insight into state of the system under various control inputs. By associating a cost with the state of the system, an MPC controller decides which control input results in lowest cost. Assuming the mathematical model accurately reflect the system, the MPC controller can yield optimal control actions that minimize the desired cost. The optimization problem for an MPC controller can be defined as:

$$\min_{a_t} \sum_{t=t_0}^{t_0+T} L(s_t, a_t) \qquad (29)$$

$$\text{subject to: } s_{t+1} = M(s_t, a_t)$$

where $L(s_t, a_t)$ is the cost associated with state and action, $M(s_t, a_t)$ being the mathematical model representing the future state of the system, and T being the prediction horizon for optimization.

In order to implement an MPC based AS controller 412, a cost function is defined that can be evaluated for different actions. The action that results in the lowest cost can then be selected as the optimal action by the AS controller 412. In example embodiments, the cost function is defined as a function of current state and next action based on the predictions as follows:

$$L(s_t, a_t) = -f_{safe}(s_t, a_t, h_{pref}^{safe}, \text{FRONT}) \times w_1 - \qquad (30)$$
$$f_{safe}(s_t, a_t, h_{pref}^{safe}, \text{BACK}) \times w_2 + e^{-\alpha|v_{target} - f_{state}(s_t, a_t)|} \times w_3 -$$
$$\text{comfort}(s_t, a_t, h_{pref}^{comfort}, \text{FRONT}) \times w_4 -$$
$$\text{comfort}(s_t, a_t, h_{pref}^{comfort}, \text{BACK}) \times w_5$$

where the weights $w_1$, $w_2$, $w_3$, $w_4$, and $w_5$ are each associated with and tuned specifically for an associated predictor function to achieve desired spacing behavior.

The cost function $L(s_t, a_t)$ is evaluated for the full range of actions possible at state $s_t$. The action that results in the lowest cost value would be the optimal action for state $s_t$. Increasing each weight compared to others will increase the importance of the predictor function that is associated with the weight, hence optimization will look for the action that minimizes that term more aggressively. For example, if it is desired that front safety have higher priority than back safety, then $w_1 > w_2$.

The cost function $L(s_t, a_t)$ in equation (30) is one example of a possible function that can be used. The cost function can be modified to achieve more aggressive or even different responses at different speeds.

It will thus be appreciated that, when determining the next action, an MPC based AS controller 412 seeks the action that optimizes a certain cost function. In problems that the objective can be directly defined as a function of state and actions, an MPC based AS controller 412 can find the action that directly optimizes the objective. This may be advantageous in some cases where the cost function can be established, however in at least some applications it may be difficult to arrive at a suitably defined and tuned cost function in which case an FIS based AS controller or RL based AS controller as described above may be more appropriate.

Fourth Example of Adaptive Spacing Predictive (ASP) Control System A fourth example embodiment of an ASP control system will now be described, referring again to FIG. 8. The ASP control system according to the fourth example embodiment is the same as ASP control system 400A of FIG. 8, except that the AS controller module 412 is modified to apply rule-based control rather than RL-based control, and predictions 416 are only performed for the previous action rather than a range of possible actions in the current state. Thus, in the fourth example embodiment, the AS controller module 412 requests state, safety and optionally comfort predictions from the predictive perception module 402 for only the last action $a_{t-1}$ implemented by the AS controller module 412.

The rule-based ASP control system predict future safety and system state given that previously applied action is continued. The action will be updated based on the following rules:

If $f_{safe}(s_t, a_{t-1}, h_{pref}^{safe}, \text{FRONT}) < 0.9$ then $a_t = a_{t-1} - 0.1$
$(1 - f_{safe}(s_t, a_{t-1}, h_{pref}^{safe}, \text{FRONT}))$ Else if $f_{safe}(s_t, a_{t-1}, h_{pref}^{safe}, \text{BACK}) < 0.9$ then $a_t = a_{t-1} + 0.01$ Else if $|v_{target} - f_{state}(s_t, a_t)| > 1$ then $a_t = a_{t-1} + \max(-0.05, \min(0.01, 0.005(v_{target} - f_{state}(s_t, a_t))))$ Else $a_t = a_{t-1}$ The rules are defined by experts in the field, which guarantees sound and predictable behavior by the rule-based control system. While the predictable behavior is greatly desired, this approach does not have the complexity of other approaches and may have a more limited performance compared to the other approaches.

Further Example Embodiments

The ASP control systems 400, 400A described above can be applied to other control problems in autonomous driving and autonomous robots and not just ACC and adaptive spacing. Although described herein as a system integrated into a driver assistance or autonomous driving system, in example embodiments, ASP control systems 400, 400A can be standalone systems that are not operatively connected to drive control system 150 but rather is used to record information and provide feedback. In some example embodiments, the ASP control system 400A could be used in a passive safety system where the AS controller module 412 is omitted and replaced with a monitoring and alert module that issues. In such a case, the predictor sub-modules 403 could be limited to a safety predictor sub-module 408 that made safety predictions based inputs of current and future actions, and these predictions provided to an alert module that can issue warnings to an AD system or other system. Comfort predictor sub-module 408 can optionally be included in such a system as well.

In at least some examples, the state predictor sub-module 406 could be enhanced to include GVF based predictor functions for steering angle and traction in addition to speed, and the safety and comfort predictor modules 404, 408 could be enhanced to include GVF based predictor functions for predicting one or more of: right and left hand risk zones; distance to center of the lane; and probability of losing traction. In such examples, the AS controller module 412 may be configured to also determine a steering action for application to steering unit 152.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, GPUs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method for adaptively controlling spacing between a vehicle and a moving object in an operating environment of the vehicle, the method comprising:

determining a current state of the vehicle based on sensor data captured by sensors of the vehicle;

determining multiple possible alternative future actions for the vehicle based on the current state of the vehicle;

predicting, based on the current vehicle state, for each possible alternative future action of the multiple possible alternative future actions, a future state for the vehicle indicating the effects of each possible alternative future action on the vehicle;

predicting, based on the current vehicle state, for each possible alternative future action of the multiple possible alternative future actions, a first zone future safety value corresponding to a first safety zone of the vehicle, the first zone future safety value indicating a safety level of the vehicle for the first safety zone if the possible alternative future action is performed by the vehicle;

selecting, based on the predicted future states and first zone future safety values for each of the possible alternative future actions of the multiple possible alternative future actions, one of the multiple possible future alternative future actions as an action for the vehicle; and providing the selected action for the vehicle to a drive control system of the vehicle which causes the vehicle to perform the selected action for the vehicle to control the spacing between the vehicle and the moving object.

2. The method of claim 1 further comprising, predicting, based on the current vehicle state, for each possible alternative future action of the multiple possible alternative future actions, a second zone future safety value corresponding to a second safety zone of the vehicle, the second safety zone of the vehicle being distinct from the first safety zone of the vehicle, the second zone future safety value indicating a safety level of the vehicle for the second safety zone if the possible alternative future action is performed by the vehicle, wherein selecting the action for the vehicle is also based on the predicted second zone future safety values.

3. The method of claim 2 wherein the selected action for the vehicle is also based on a target state for the vehicle, and the method comprises controlling the vehicle to perform the selected action for the vehicle.

4. The method of claim 3 wherein
the first safety zone is located in front of the vehicle and the predicted first zone future safety value for each of the possible alternative future actions indicates a likelihood of a leading vehicle being present in the first safety zone, and
the second safety zone is located behind the vehicle and the predicted second zone future safety value for each of the possible alternative future actions indicates a likelihood of a trailing vehicle being present in the second safety zone.

5. The method of claim 4 wherein the future state, the future first zone value and the future second zone value for each possible alternative future action are predicted using one or more trained neural networks.

6. The method of claim 5 wherein the current vehicle state includes: (i) a speed of the vehicle; (ii) a distance from the vehicle to any leading vehicle detected in front of the vehicle; and (iii) a distance from the vehicle to any trailing vehicle detected in back of the vehicle.

7. The method of claim 6 wherein the current vehicle state includes a current first zone safety value indicating if any leading vehicle is currently present in the first safety zone and a current second zone safety value indicating if any trailing vehicle is currently present in the second safety zone.

8. The method of claim 1 wherein selecting the action for the vehicle comprises selecting, one of the possible alternative future actions for the vehicle from the set comprising multiple possible alternative future actions, for which the predicted future state satisfies a state condition and the predicted future first zone safety value satisfies a first zone safety condition.

9. The method of claim 1 wherein selecting the action for the vehicle is performed by a fuzzy inference system, the selecting further comprising:
receiving the predicted future states and first zone future safety values, wherein for each possible alternative future action, the predicted future state includes a vehicle speed prediction, and the predicted first zone future safety value includes a vehicle safety level;
performing fuzzification of the vehicle speed predictions to map the vehicle speed predictions to target speed truth values that denote closeness of the vehicle speed predications to a target speed;
performing fuzzification of the vehicle safety predictions to map the safety predictions to safety fuzzy truth values;
based on the target speed truth values and the safety fuzzy truth values, performing fuzzy inference to generate a goal fuzzy set;
defuzzifying the goal fuzzy set to select, as the action for the vehicle, a best action from the multiple possible alternative future actions to satisfy the state condition and the first zone safety condition.

10. The method of claim 1 wherein for each of the possible alternative future actions in the set comprising multiple possible alternative future actions, the first zone future safety value indicates a probability that the first safety zone will be free of both static and moving obstacles.

11. The method of claim 1 further comprising:
predicting, based on the current vehicle state, for each possible alternative future action of the multiple possible alternative future actions, a future comfort value corresponding to a comfort zone of the vehicle, the future comfort value indicating a comfort level of the vehicle for the comfort zone if the possible alternative future action is performed by the vehicle; and
wherein selecting the action for the vehicle is also based on the comfort values predicted for each possible alternative future action of the multiple possible alternative future actions.

12. An adaptive spacing predictive control system for controlling a vehicle to adaptively control spacing between the vehicle and a moving object in an operating environment of the vehicle, comprising:
a processor system;
a memory coupled to the processor system, the memory tangibly storing thereon executable instructions that, when executed by the processor system, cause the processor system to:
determine a current state of the vehicle based on sensor data captured by sensors of the vehicle;
determine multiple possible alternative future actions for the vehicle based on the current state of the vehicle;
predict, based on the current vehicle state, for each possible alternative future action of the multiple possible alternative future actions, a future state for the vehicle indicating the effects of each possible alternative future action on the vehicle;
predict, based on the current vehicle state, for each possible alternative future action of the multiple possible alternative future actions, a first zone future safety value corresponding to a first safety zone of the vehicle, the first zone safety value indicating a safety level of the vehicle for the first safety zone;
select, based on the predicted future states and first zone future safety values for each of the possible alternative future actions, one of the multiple possible future alternative future actions as an action for the vehicle; and
provide the selected action for the vehicle to a drive control system of the vehicle which causes the vehicle to perform the selected action for the vehicle to control the spacing between the vehicle and the moving object.

13. The system of claim 12 wherein the machine-executable instructions, when executed by the processor system, cause the processor system to:
predict, based on the current vehicle state, for each possible alternative future action of the multiple possible alternative future actions, a future comfort value corresponding to a comfort zone of the vehicle, the future comfort value indicating a comfort level of the vehicle for the comfort zone if the possible alternative future action is performed by the vehicle; and wherein selecting the action for the vehicle is also based on the comfort values predicted for each possible alternative future action of the multiple possible alternative future actions.

14. The system of claim 12 wherein the executable instructions, when executed by the processor system, also cause the processor system to:
predict, based on the current vehicle state, for each possible alternative future action of the multiple possible alternative future actions, a second safety zone future safety value corresponding to a second safety zone of the vehicle, the second safety zone of the vehicle being distinct from the first safety zone of the vehicle, the second zone future safety value indicating a safety level of the vehicle for the second safety zone if the possible alternative future action is performed by the vehicle; and
select the action for the vehicle based also on the predicted second zone future safety values.

15. The system of claim 14 wherein the executable instructions, when executed by the processor system, also cause the processor system to select the vchicic action for the vehicle also based on a target vehicle state.

16. The system of claim 15 wherein:
the first safety zone is located in front of the vehicle and the predicted first zone future safety value for each of the possible alternative future actions indicates a likelihood of a leading vehicle being present in the first safety zone, and
the second safety zone is located behind the vehicle and the predicted second zone future safety value for each of the possible alternative future actions indicates a likelihood of a trailing vehicle being present in the second safety zone.

17. The system of claim 16 wherein the executable instructions, when executed by the processor system, cause the processor system to predict one or more of the future state for each possible alternative future action in the set comprising multiple possible alternative future actions, the first zone future safety value, and the second zone future safety value using trained neural networks.

18. The system of claim 12 wherein the executable instructions, when executed by the processor system, cause the processor system to select the action for the vehicle using a fuzzy inference system by:
receiving the predicted future states and first zone future safety values, wherein for each possible alternative future action, the predicted future state includes a vehicle speed prediction, and the predicted first zone future safety value includes a vehicle safety level,
performing fuzzification of the vehicle speed predictions to map the vehicle speed predictions to target speed truth values that denote closeness of the vehicle speed predications to a target speed;
performing fuzzification of the vehicle safety predictions to map the safety predictions to safety fuzzy truth values;
based on the target speed truth values and the safety fuzzy truth values, performing fuzzy inference to generate a goal fuzzy set;
defuzzifying the goal fuzzy set to select, as the action for the vehicle, a best action from multiple possible alternative future actions to satisfy the state condition and the first zone safety condition.

19. A computer program product comprising a medium tangibly storing thereon executable instructions that, when executed by a processor system in a vehicle, cause the processor system to control a vehicle to adaptively control spacing between the vehicle and a moving object in an operating environment of the vehicle by:
determining a current state of the vehicle based on sensor data captured by sensors of the vehicle;
determining multiple possible alternative future actions for the vehicle based on the current state of the vehicle;
predicting, based on the current vehicle state, for each possible alternative future action of the multiple possible alternative future actions, a future state for the vehicle;
predicting, based on the current vehicle state, for each possible alternative future action of the multiple possible alternative future actions, a first zone future safety value corresponding to a first safety zone of the vehicle, the first zone future safety value indicating a safety level of the vehicle for the first safety zone if the possible alternative future action is performed by the vehicle;
selecting, based on the predicted future states and first zone future safety values for each of the possible alternative future actions of the multiple possible future alternative future actions, an action for the vehicle; and
providing the selected vehicle action for the vehicle to a drive control system of the vehicle which causes the vehicle to perform the selected action for the vehicle to control the spacing between the vehicle and the moving object.

* * * * *